(12) United States Patent
Yang et al.

(10) Patent No.: US 12,099,705 B2
(45) Date of Patent: Sep. 24, 2024

(54) INTERACTION METHOD AND APPARATUS BASED ON ELECTRONIC MAP, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Lu Yang, Shenzhen (CN); Kai Wang, Shenzhen (CN); Yi Zhao, Shenzhen (CN); Yaqing Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/989,618

(22) Filed: Nov. 17, 2022

(65) Prior Publication Data
US 2023/0083051 A1    Mar. 16, 2023

Related U.S. Application Data

(63) Continuation of application No. PCT/CN2022/073461, filed on Jan. 24, 2022.

(30) Foreign Application Priority Data

Jan. 29, 2021    (CN) .......................... 202110125340.7

(51) Int. Cl.
*G06F 3/04842*    (2022.01)
*G06F 16/29*    (2019.01)

(52) U.S. Cl.
CPC .......... *G06F 3/04842* (2013.01); *G06F 16/29* (2019.01)

(58) Field of Classification Search
CPC .. G06F 3/04842; G06F 16/29; G06F 3/04845; G01C 21/3682
See application file for complete search history.

(56) References Cited

U.S. PATENT DOCUMENTS 6,208,934 B1 *   3/2001   Bechtolsheim .... G01C 21/3688
                                                            701/428
10,094,675 B2 * 10/2018   Hajj ...................... G08G 1/123
(Continued)

FOREIGN PATENT DOCUMENTS

| CN | 107644022 A | 1/2018 |
|----|-------------|--------|
| CN | 108496214 A | 9/2018 |

(Continued)

OTHER PUBLICATIONS

Tencent Technology, ISR, PCT/CN2022/073461, Apr. 22, 2022, 3 pgs.

(Continued)

*Primary Examiner* — Ariel Mercado-Vargas
(74) *Attorney, Agent, or Firm* — Morgan, Lewis & Bockius LLP

(57) ABSTRACT

This application provides an interaction method based on an electronic map performed by an electronic device. The method includes: presenting an electronic map in a human-computer interaction interface; and in response to an interaction operation on points of interest in the electronic map, presenting, on the electronic map, a first point of interest according to a first state, and presenting at least one second point of interest with a same name as the first point of interest according to a second state, the first state being different from the second state.

20 Claims, 15 Drawing Sheets

(56) References Cited

U.S. PATENT DOCUMENTS

| | | | |
|---|---|---|---|
| 2010/0106400 A1* | 4/2010 | Park | G01C 21/3682 |
| | | | 707/769 |
| 2010/0115459 A1 | 5/2010 | Kinnunen et al. | |
| 2012/0316782 A1* | 12/2012 | Sartipi | G01C 21/367 |
| | | | 345/667 |
| 2013/0249812 A1* | 9/2013 | Ramos | G01C 21/367 |
| | | | 345/589 |
| 2013/0326380 A1* | 12/2013 | Lai | G06F 3/04815 |
| | | | 715/765 |
| 2015/0187107 A1 | 7/2015 | Vander Mey et al. | |
| 2016/0061624 A1* | 3/2016 | Newlin | G01C 21/3611 |
| | | | 701/426 |
| 2016/0080438 A1 | 3/2016 | Liang | |
| 2017/0359695 A1* | 12/2017 | Aerts | G01C 21/3874 |
| 2018/0143026 A1* | 5/2018 | Greenberg | G06Q 50/2053 |
| 2018/0150921 A1* | 5/2018 | Greenberg | G01C 21/3476 |

FOREIGN PATENT DOCUMENTS

| | | |
|---|---|---|
| CN | 110659337 A | 1/2020 |
| CN | 110741229 A | 1/2020 |

OTHER PUBLICATIONS

Tencent Technology, WO, PCT/CN2022/073461, Apr. 22, 2022, 4 pgs.

Tencent Technology, IPRP, PCT/CN2022/073461, Jul. 31, 2023, 5 pgs.

* cited by examiner

INTERACTION METHOD AND APPARATUS BASED ON ELECTRONIC MAP, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/073461, entitled "INTERACTIVE METHOD AND APPARATUS BASED ON ELECTRONIC MAP, AND ELECTRONIC DEVICE, COMPUTER-READABLE STORAGE MEDIUM AND COMPUTER PROGRAM PRODUCT" filed on Jan. 24, 2022, which claims priority to Chinese Patent Application No. 202110125340.7, filed with the State Intellectual Property Office of the People's Republic of China on Jan. 29, 2021, and entitled "INTERACTION METHOD AND APPARATUS BASED ON ELECTRONIC MAP, AND ELECTRONIC DEVICE", all of which are incorporated herein by reference in their entirety.

FIELD OF THE TECHNOLOGY

This application relates to computer technologies, and in particular, to an interaction method and apparatus based on an electronic map, an electronic device, a computer program product, and a computer-readable storage medium.

BACKGROUND OF THE DISCLOSURE

An electronic map, also referred to as a digital map, is a map that is digitally stored and consulted by using a computer technology, which is widely used in traffic scenarios such as daily trips and travel guides. During use of the electronic map, a user often performs an interaction operation (for example, a click/tap operation) on points of interest in the electronic map to find a point of interest that meets a requirement.

In the solution provided in the related art, interacted points of interest are usually presented differently from other points of interest. However, the solution causes the user to perform a plurality of interactions to find the required points of interest, that is, the interaction efficiency is poor, and also causes unnecessary waste of computing resources consumed by an electronic device during interaction.

SUMMARY

Embodiments of this application provide an interaction method and apparatus based on an electronic map, an electronic device, a computer program product, and a computer-readable storage medium, which can improve interaction efficiency and also improve an actual utilization rate of computing resources consumed by the electronic device.

The technical solutions of the embodiments of this application are implemented as follows.

The embodiments of this application provide an interaction method based on an electronic map, including:
presenting an electronic map in a human-computer interaction interface; and
in response to an interaction operation on points of interest in the electronic map, presenting, on the electronic map, a first point of interest according to a first state, and presenting at least one second point of interest with a same name as the first point of interest according to a second state,
the first state being different from the second state.

The embodiments of this application provide an interaction apparatus based on an electronic map, including:
a map presentation module, configured to present an electronic map in a human-computer interaction interface; and
a state presentation module, configured to, in response to an interaction operation on points of interest in the electronic map, present, on the electronic map, a first point of interest according to a first state, and present at least one second point of interest with a same name as the first point of interest according to a second state,
the first state being different from the second state.

The embodiments of this application provide an electronic device, including:
a memory, configured to store executable instructions; and
a processor, configured to implement the interaction method based on an electronic map provided in the embodiments of this application when executing the executable instructions stored in the memory.

The embodiments of this application provide a non-transitory computer-readable storage medium storing executable instructions, the executable instructions, when executed by a processor of an electronic device, causing the electronic device to implement the interaction method based on an electronic map provided in the embodiments of this application.

The embodiments of this application provide a computer program product, including a computer program or instructions, the computer program or instructions, when executed by a processor, implementing the interaction method based on an electronic map provided in the embodiments of this application.

The embodiments of this application have the following beneficial effects.

When an interaction operation on points of interest in an electronic map is received, a first point of interest is presented according to a first state, and at least one second point of interest with a same name as the first point of interest is presented according to a second state. In this way, on one hand, a plurality of points of interest, that is, the first point of interest and the second point of interest, that may meet a requirement of a user can be highlighted. On the other hand, the first point of interest and the second point of interest that have the same name can also be effectively differentiated, so that the user can quickly find a point of interest that meets the requirement. Therefore, the interaction efficiency in the electronic map can be improved, and the actual utilization rate of the computing resources consumed by the electronic device during interaction can also be improved.

DESCRIPTION OF EMBODIMENTS

Figure 1:
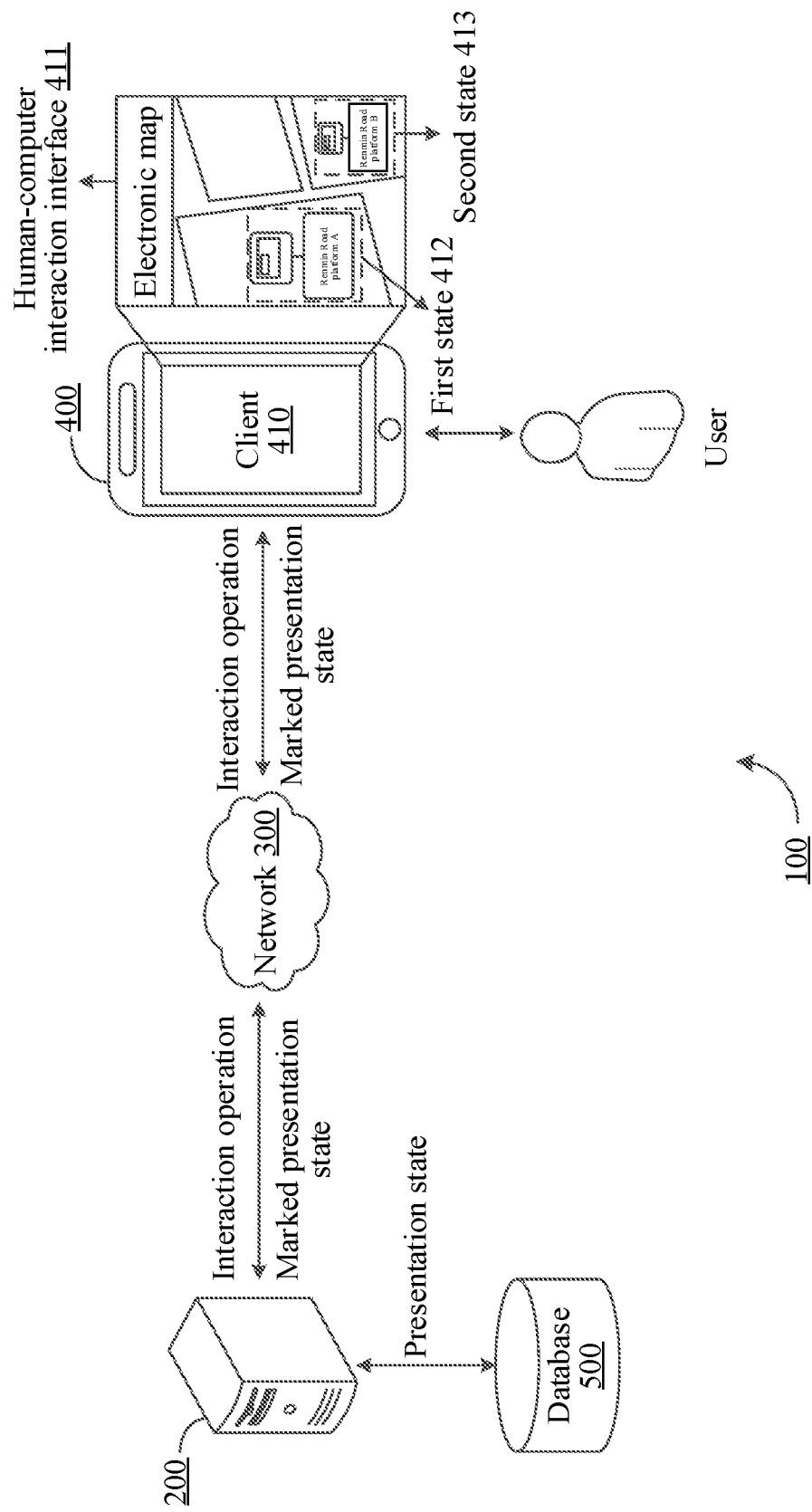
FIG. 1 is a schematic diagram of an architecture of an interaction system based on an electronic map according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third/fourth" is merely intended to distinguish similar objects but does not necessarily indicate a specific order of an object. It may be understood that "first/second/third/fourth" is interchangeable in terms of a specific order or sequence if permitted, so that the embodiments of this application described herein can be implemented in a sequence in addition to the sequence shown or described herein. In the following description, the term "plurality of" means at least two.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, terms involved in the embodiments of this application are described. The terms provided in the embodiments of this application are applicable to the following explanations.

(1) Electronic map: also referred to as a digital map, is a map that is digitally stored and consulted by using a computer technology, and may be presented visually through specific hardware or software, for example, may be presented in a human-computer interaction interface. A type of the electronic map is not limited in the embodiments of this application, for example, the electronic map may be two-dimensional or three-dimensional.

(2) In response to: used for representing a condition or a status on which a to-be-performed operation depends. When the condition or the status is satisfied, one or more to-be-performed operations may be real-time or have a set delay. Unless otherwise specified, there is no chronological order between the plurality of to-be-performed operations.

(3) Point of interest (POI): is an information map in an electronic map, and a type thereof includes, but not limited to, a shop, a mailbox, a platform (for example, a bus stop or a subway platform), and a scenic spot. In the embodiments of this application, interaction may be performed on points of interest of all types or may be performed on only points of interest of a specific type (for example, a bus stop), which is depend on an actual application scenario.

(4) Interaction operation: refers to a received operation for interacting with a point of interest in an electronic map. The type of the interaction operation includes, but not limited to, a search operation and a selecting operation.

(5) Presentation state: refers to a presentation state of a point of interest in an electronic map. Different presentation states have different visual effects. For example, the presentation state may refer to presenting an icon corresponding to a point of interest according to at least one of a specific color or a size, content in the icon including at least one of a name of the point of interest and unique identification information. The types of presentation states may include a first state, a second state, a third state, and a fourth state, the first state, the second state, the third state, and the fourth state are different from each other, for example, the colors of the first state, the second state, the third state, and the fourth state are different from each other, and the sizes of the first state, the second state, the third state and the fourth state are different from each other.

(6) Database: is a data set that is stored together in a particular manner and can be shared by a plurality of users, has as less redundancy as possible, and is independent of an application program. Users can perform operations such as adding, searching, updating, and deleting on data in the database. In the embodiments of this application, the database may be configured to store related data of the electronic map.

The embodiments of this application provide an interaction method and apparatus based on an electronic map, an electronic device, a computer program product, and a computer-readable storage medium, which can improve interaction efficiency and also improve an actual utilization rate of computing resources of the electronic device. The following describes an exemplary application of an electronic device provided by an embodiment of this application, and the electronic device provided by this embodiment of this application may be independently completed by a terminal, or may be completed by a terminal and a server cooperatively.

FIG. 1 is a schematic diagram of an architecture of an interaction system 100 based on an electronic map according to an embodiment of this application. A terminal device 400 is connected to a server 200 through a network 300, the server 200 is connected to a database 500, and the network 300 may be a wide area network or a local area network, or a combination of the two.

In some embodiments, the interaction method based on an electronic map provided by this embodiment of this application may be independently implemented by a terminal device. For example, the terminal device 400 runs a client 410 (for example, a map application in an offline state), and the client 410 presents an electronic map in a human-computer interaction interface based on relevant data (for example, road data and location data of points of interest of the electronic map cached locally. When the client 410 receives an interaction operation on a point of interest in the electronic map, a first point of interest is marked as a first state, at least one second point of interest with a same name as the first point of interest is marked as a second state, and then the corresponding points of interest are presented according to the marked presentation states. The relevant data (for example, at least one of a color or a size of an icon and content of the icon) of various presentation states may also be prestored locally in the client 410. When required, the relevant data of the presentation states is called to load the presentation state.

In some embodiments, the interaction method based on an electronic map provided by this embodiment of this application may alternatively be implemented by a server and a terminal device cooperatively. For example, the terminal device 400 runs a client 410 (for example, an online map application), and when receiving a trigger operation on an electronic map, the client 410 sends a request to the server 200 to obtain relevant data of the electronic map stored in the server 200 (for example, in the database 500). Then, the client 410 presents the electronic map in a human-computer interaction interface according to the obtained relevant data of the electronic map. Certainly, the relevant data of the electronic map may also be prestored locally in the client 410. When receiving an interaction operation on a point of interest in the electronic map, the client 410 sends the interaction operation (referring to relevant data of the interaction operation) to the server 200, so that the server 200 determines a first state marked for a first point of interest and a second state marked for a second point of interest. The server 200 may directly send relevant data of the marked presentation state (which may be stored in the database 500) and a correspondence between the marked presentation state and the point of interest to the client 410, so that the client 410 presents the corresponding point of interest according to the marked presentation state; Alternatively, the client 410 may prestore relevant data of various presentation states, and the server 200 sends state identification information (for example, a serial number) of the marked presentation state and a correspondence between the state identification information and the point of interest to the client 410, so that the client 410 invokes the relevant data of the locally stored presentation state (referring to the marked presentation state) according to the state identification information to present the corresponding point of interest.

As an example, in FIG. 1, an example in which a point of interest is a platform is used, a human-computer interaction interface 411 shows a platform A in Renmin Road and a platform B in Renmin Road, which both include a same name "Renmin Road". When receiving an interaction operation on the platform A in Renmin Road, the platform A in Renmin Road is presented according to a first state 412, and the platform B in Renmin Road is presented according to a second state 413. Content of an icon corresponding to the presentation state in FIG. 1 includes a graphic, a name, and unique identification information (that is, the platform A or the platform B) of the platform. A size of an icon corresponding to the first state 412 is larger than that of the second state 413, so that the platform A and the platform B may be effectively differentiated.

In some embodiments, the terminal device 400 or the server 200 may implement the interaction method based on an electronic map provided by this embodiment of this application by running a computer program, for example, the computer program may be a native program or a software module in an operating system; may be a native application (APP), that is, a program that needs to be installed in the operating system before running, for example, a map application (corresponding to the client 410); may be an applet, that is, a program that is executable by just being downloaded into a browser environment; or may be an applet that can be embedded in any APP, for example, an applet component embedded in a map application, and the applet component may be controlled to run or close by the user. In summary, the foregoing computer program may be any application, module, or plug-in in any form.

In some embodiments, the server 200 may be an independent physical server, or may be a server cluster including a plurality of physical servers or a distributed system, or may be a cloud server providing basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform, where the cloud service may be an interaction service based on an electronic map for the terminal device 400 to invoke. The terminal device 400 may be a smartphone, a tablet computer, a notebook computer, a desktop computer, a smart TV, a smart watch, or the like, but is not limited thereto. The terminal device and the server may be directly or indirectly connected in a wired or wireless communication manner. This is not limited in this embodiment of this application.

Figure 2:
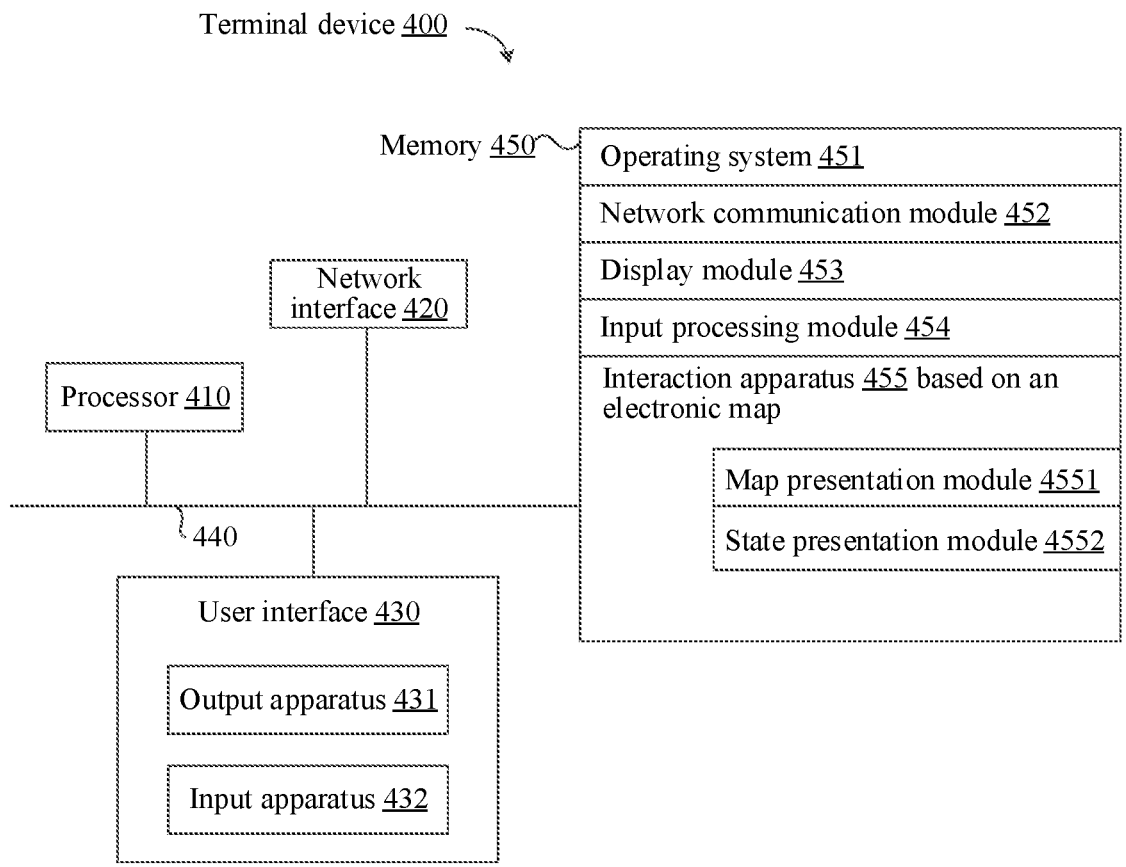
FIG. 2 is a schematic diagram of an architecture of a terminal device according to an embodiment of this application.

FIG. 2 is a schematic structural diagram of a terminal device 400 according to an embodiment of this application. As shown in FIG. 2, the terminal device 400 includes: at least one processor 410, a memory 450, at least one network interface 420, and a user interface 430. All the components in the terminal device 400 are coupled together by using the bus system 440. It may be understood that, the bus system 440 is configured to implement connection and communication between the components. In addition to a data bus, the bus system 440 further includes a power bus, a control bus, and a state signal bus. However, for ease of clear description, all types of buses in FIG. 2 are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450, in some embodiments, includes one or more storage devices physically away from the processor 410.

The memory 450 includes a volatile memory or a non-transitory memory, or may include both a volatile memory and a non-transitory memory. The non-transitory memory may be a read-only memory (ROM). The volatile memory may be a random access memory (RAM). The memory 450 described in this embodiment of this application is to include any other suitable type of memories.

In some embodiments, the memory 450 can store data to support various operations. Examples of the data include a program, a module, and a data structure, or a subset or a superset thereof, which are described below by using examples.

An operating system 451 includes a system program configured to process various basic system services and perform a hardware-related task, for example, a framework layer, a core library layer, or a driver layer, and is configured to implement various basic services and process a hardware-based task.

A network communication module 452 is configured to reach another computing device through one or more (wired or wireless) network interfaces 420. Exemplary network interfaces 420 include: Bluetooth, wireless compatible authentication (Wi-Fi), a universal serial bus (USB), or the like.

A presentation module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the apparatus provided in the embodiments of this application may be implemented in the form of software. FIG. 2 shows an interaction apparatus 455 based on an electronic map stored in the memory 450, which may be software in the form of a program and a plug-in, or the like, and includes the following software modules: a map presentation module 4551 and a state presentation module 4552. These modules are logical modules, and may be randomly combined or further divided based on a function to be performed. The following describes functions of the modules.

The interaction method based on an electronic map provided in the embodiments of this application is described with reference to an exemplary application and implementation of the electronic device provided in this embodiment of this application.

Figure 3A:
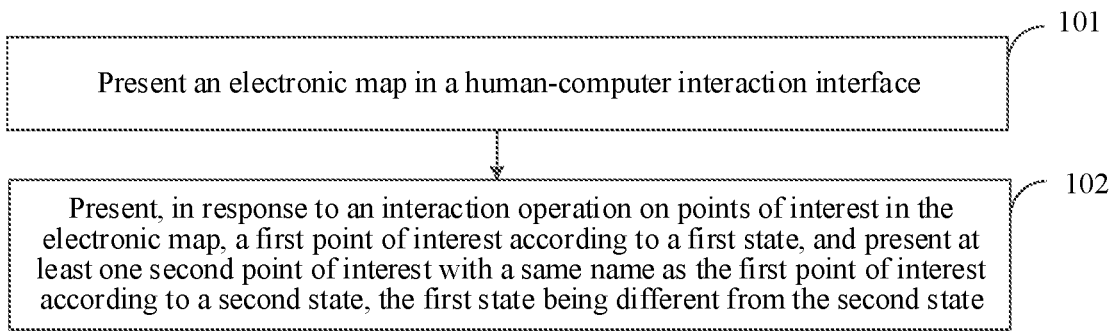
FIG. 3A is a schematic flowchart of an interaction method based on an electronic map according to an embodiment of this application.

FIG. 3A is a schematic flowchart of an interaction method based on an electronic map according to an embodiment of this application, and steps shown in FIG. 3A are combined for description.

Step 101. Present an electronic map in a human-computer interaction interface.

When the electronic map is presented, points of interest in the electronic map may be presented simultaneously, for example, may be presented in a default presentation state. The default presentation state may be any one of a first state, a second state, a third state, or a fourth state. Alternatively, points of interest in the electronic map may not be presented, for example, only a road and a river in the electronic map are presented. The points of interest may refer to points of interest of all types or may refer to points of interest of a specific type (for example, a bus stop).

A type of the electronic map is not limited in this embodiment of this application, for example, the electronic map may be a two-dimensional or three-dimensional electronic map. In another example, the electronic map may be an electronic map corresponding to a real world or a fictitious electronic map such as an electronic map in a virtual scene, the virtual scene referring to a scene outputted by an electronic device and different from the real world, for example, a game virtual scene.

In this step, the electronic map centered on a set location or a real-time location may be presented. A real-time location in the real world may be obtained in real time through a global positioning system (GPS) or the like. A real-time location in the virtual scene may be directly obtained from relevant data of the virtual scene.

Step 102. In response to an interaction operation on points of interest in the electronic map, present, on the electronic map, a first point of interest according to a first state, and present at least one second point of interest with a same name as the first point of interest according to a second state. The first state is different from the second state.

The interaction operation may be a search operation or a selecting operation on a point of interest already presented in the electronic map, and the selecting operation is a click/tap operation, a long-press operation, or the like. When the interaction operation on the point of interest in the electronic map is received, a point of interest that interacts with the interaction operation is determined as the first point of interest. Because in the real world or the virtual scene, a plurality of points of interest often have a same name, for example, a site includes a plurality of platforms (a platform is a point of interest) with a same name (that is, a site name), and a scenic spot includes a plurality of entrances (an entrance is a point of interest) with a same name (that is, a scenic spot name), the first point of interest may not be a point of interest that meets a requirement of a user. Therefore, another point of interest with a same name as the first point of interest is further determined as the second point of interest, and the second point of interest is different from the first point of interest. A quantity of second points of interest are not limited herein. To improve the accuracy of the determined second point of interest, other points of interest whose distances to the first point of interest are less than a distance threshold may further be first selected, and then a point of interest with a same name as the first point of interest may be selected from the points of interest as the second point of interest. The distance may be a straight-line distance or a traffic distance, and meanings of the two distances are described below in detail.

After the first point of interest and the at least one second point of interest are obtained, the first point of interest is presented according to the first state, and each second point of interest is presented according to the second state. Therefore, it can be clearly reflected that the point of interest presented according to the first state is a currently interacted point of interest and the point of interest presented according to the second state is a point of interest that may meet the requirement, which is convenient for the user to quickly search. Other points of interest than the first point of interest and the second point of interest may not be presented, or may be presented according to other presentation states (for example, a third state or a fourth state) for distinction.

In this embodiment of this application, a presentation state may refer to presenting an icon corresponding to a point of interest according to at least one of a specific color or size. The icon refers to a mark that is presented in the electronic map and used for representing the point of interest, and the icon is not necessary a graphic, for example, the icon may be in a form of text. Content in the icon may include at least one of a graphic representing a type of the point of interest (for example, a schematic graphic of a bus stop), a name of the point of interest, or unique identification information of the point of interest, and for different presentation states, presentation parameters (referring to color and/or size) of the graphic vary. For example, the first state refers to presenting an icon corresponding to a point of interest according to a first size, and the icon includes a graphic, a name, and unique identification information. The second state refers to presenting an icon corresponding to a point of interest according to a second size, and the icon includes a graphic, a name, and unique identification information, the first size being larger than the second size. The icon may be superimposed on a base map of the electronic map, so as to be presented in the electronic map. The base map is a bottom layer among a plurality of layers of the electronic map, the bottom layer may be a relief map, and layers of various points of interest attached to the ground may be superimposed on the bottom map. The bottom layer is not affected by the adjustment of order of the layers, and always exists at the bottom as a container for other layers. Certainly, the icon may be presented in another manner In some embodiments, when the presenting a first point of interest according to a first state, and presenting at least one second point of interest with a same name as the first point of interest according to a second state, the method further includes: performing any one of the following processing: for each point of interest in the first point of interest and the at least one second point of interest, presenting summary information corresponding to the point of interest; and presenting summary information corresponding to the first point of interest, the summary information corresponding to the point of interest being obtained by performing summary extraction processing on detailed information corresponding to the point of interest.

Points of interest in the electronic map correspond to detailed information. Taking a bus stop as an example, the detailed information may include a name, unique identification information, a quantity of bus lines in operation, and the latest update time of the bus line, and may also include a name of each bus line, a destination, a ticket price, time of the first bus, time of the last bus, arrival time of a closest bus, a quantity of stops separated from the closest bus, a degree of congestion of the closest bus, and the like. The detailed information has a relatively large amount of information and is not easy to read quickly. Therefore, the summary information may be obtained by performing summary extraction processing on the detailed information corresponding to the points of interest. The summary information includes key information in the detailed information. The method of summary extraction processing is not limited and may be set according to an actual application scenario. Similarly, taking a bus stop as an example, the summary information may include at least one of the following: a name, unique identification information, and names of a plurality of bus lines in operation. In this way, by presenting the summary information, the user can quickly understand a corresponding point of interest, and determine whether the point of interest meets the requirement.

Corresponding summary information may be presented while the first point of interest is presented according to the first state and the at least one second point of interest is presented according to the second state. The summary information may be presented in two ways. The first way is to present summary information corresponding to each point of interest of the first point of interest and all second points of interest. This way can improve the comprehensiveness of information presentation, which is convenient for the user to comprehensively understand the first point of interest and the second point of interest. The second method is to present only the summary information corresponding to the first point of interest, which can improve the pertinence of the first point of interest and avoid the interference to the user caused by the summary information corresponding to the second point of interest. The emphases of the foregoing two presentation ways are different, and any one of them may be applied according to the actual application scenario. After the summary information is presented, corresponding detailed information may be presented in response to a viewing operation on the summary information, facilitating in-depth understanding of the user.

In some embodiments, after step 102, the method further includes: replacing, in response to a selecting operation on any second point of interest, the first point of interest according to a selected second point of interest; and switching a presentation state of the replaced first point of interest from the second state to the first state, and switching a presentation state of the first point of interest before replacement from the first state to the second state.

In the embodiments of this application, a replacement operation on the first point of interest is also supported. For example, after the first point of interest is presented according to the first state, and the at least one second point of interest is presented according to the second state, if a selecting operation on any second point of interest is received, the first point of interest is replaced according to a selected second point of interest. For the replaced first point of interest (that is, the selected second point of interest), a presentation state is switched from the second state to the first state. For the first point of interest before replacement (that is, the initial first point of interest), a presentation state is switched from the first state to the second state. A quantity of replacement operations is not limited in the embodiments of this application. The foregoing method can improve the degree of freedom and flexibility of interaction, and can fully meet an interaction requirement of the user.

As shown in FIG. 3A, in this embodiment of this application, a first point of interest is presented according to a first state, and at least one second point of interest is presented according to a second state, so that the user can quickly find a point of interest that meets the requirement, that is, an interaction duration can be reduced, and the interaction efficiency can be improved, so that the method is suitable for a scenario such as traffic navigation. For an electronic device, computing resources consumed by the electronic device during interaction can be effectively utilized, and the computing resources of the electronic device can also be saved.

Figure 3B:
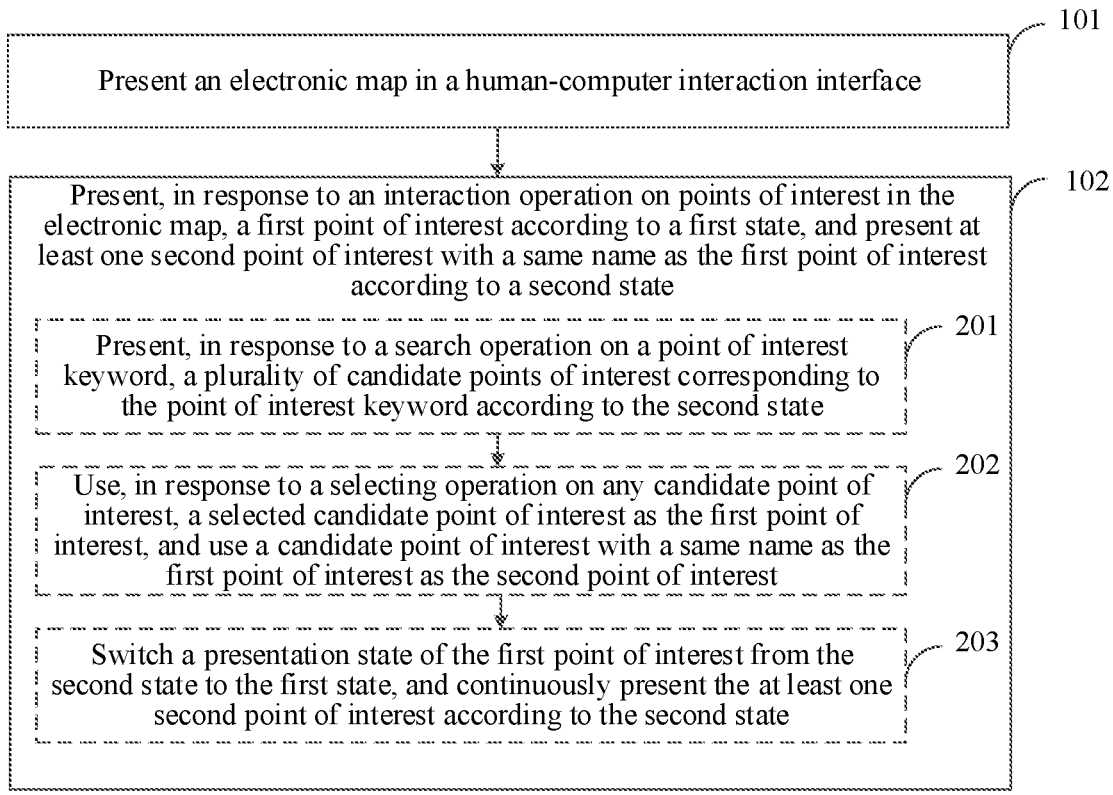
FIG. 3B is a schematic flowchart of an interaction method based on an electronic map according to an embodiment of this application.

In some embodiments, FIG. 3B is a schematic flowchart of an interaction method based on an electronic map according to an embodiment of this application. Step 102 shown in FIG. 3A may be implemented through steps 201 to 203, and a description is made with reference to each step.

Step 201. Present, in response to a search operation on a point of interest keyword, a plurality of candidate points of interest corresponding to the point of interest keyword according to the second state.

The interaction operation may include a search operation and a selecting operation. When a search operation (that is, a search request including the point of interest keyword) on a point of interest keyword is received, a plurality of points of interest corresponding to the point of interest keyword are determined as candidate points of interest. The point of interest keyword may be at least one of features such as a name, a type, and a purpose of a point of interest, and the usage is also called a function, for example, eating, playing, refueling, or parking.

A point of interest corresponding to the point of interest keyword satisfies at least one of the following conditions: A feature of the point of interest is exactly the same as the point of interest keyword (that is, a similarity is 100%), the feature of the point of interest is different from the point of interest keyword, and the similarity between the two is greater than a similarity threshold (which is named as a search similarity threshold for ease of distinguishing). The similarity between the feature of the point of interest and the point of interest keyword may be calculated according to an edit distance algorithm, a machine learning model (for example, a word2vec model), or other methods.

An example in which the point of interest keyword is a name is used, if the point of interest keyword is "Yongfeng Road", candidate points of interest may include only a point of interest named "Yongfeng Road", or may include a point of interest named "Yongfeng Road South Road" and a point of interest named "Yongfeng Road Hospital". A similarity between "Yongfeng Road South Road" and "Yongfeng Road" is greater than the search similarity threshold, and a similarity between "Yongfeng Road Hospital" and "Yongfeng Road" is also greater than the search similarity threshold.

After a plurality of candidate points of interest are obtained, the plurality of candidate points of interest are presented according to a same presentation state. The same presentation state is, for example, the second state, or certainly may be the first state, the third state, or the fourth state. For ease of understanding, a description is made below by using the second state.

Step 202. Use, in response to a selecting operation on any candidate point of interest, a selected candidate point of interest as the first point of interest, and use a candidate point of interest with a same name as the first point of interest as the second point of interest.

When a selecting operation on any candidate point of interest is received, it indicates that the user requires to view a selected candidate point of interest, so that the selected candidate point of interest is used as the first point of interest. Among the plurality of candidate points of interest, a candidate point of interest with a same name as the first point of interest is used as the second point of interest, and the second point of interest is different from the first point of interest.

In some embodiments, when the plurality of candidate points of interest corresponding to the point of interest keyword are presented according to the second state, summary information respectively corresponding to the plurality of candidate points of interest may also be presented; and detailed information corresponding to any candidate point of interest is presented in response to a viewing operation on the summary information corresponding to any candidate point of interest.

When the plurality of candidate points of interest are presented according to the second state, summary information respectively corresponding to the plurality of candidate points of interest may also be presented, so that the user can quickly understand the plurality of candidate points of interest, thereby improving the efficiency of human-computer interaction, and improving the actual utilization of computing resources consumed by the electronic device during interaction. Based on this, when a viewing operation on the summary information corresponding to any candidate point of interest is received, it is proved that the user requires to further understand the candidate point of interest, so that detailed information corresponding to the candidate point of interest is presented. Through the foregoing manner, the user can quickly and accurately perform the selecting operation, thereby improving the interaction efficiency.

In some embodiments, the selecting operation on any candidate point of interest includes any one of the following: a selecting operation on an icon corresponding to any candidate point of interest; or a selecting operation on the summary information corresponding to any candidate point of interest.

Presenting the plurality of candidate points of interest according to the second state may refer to presenting icons corresponding to the plurality of candidate points of interest. In this case, the selecting operation on the icon corresponding to any candidate point of interest may be used as the selecting operation on the candidate point of interest; and the selecting operation on the summary information corresponding to any candidate point of interest may also be used as the selecting operation on the candidate point of interest. Through the foregoing manner, the execution flexibility of the selecting operation can be improved, which conforms to the operation habits of different users.

For ease of distinguishing, for each presented summary information, a viewing option and a selecting option may be presented simultaneously. In this way, a trigger operation (for example, a click/tap operation) on a viewing option of summary information may be used as a viewing operation on the summary information; and a trigger operation on a selecting option for summary information is used as a selecting operation on the summary information. Certainly, the viewing operation and the selecting operation may be defined according to an actual application scenario, and are not limited to the examples herein.

Step 203. Switch a presentation state of the first point of interest from the second state to the first state, and continuously present the at least one of second point of interest according to the second state.

After the first point of interest and the at least one second point of interest are determined from the plurality of candidate points of interest, a presentation state of the first point of interest is switched from the second state to the first state, and all the second points of interest are continuously presented according to the second state.

The candidate points of interest that are different from the first point of interest and the second point of interest may not be presented, or may be presented according to a presentation state different from the first state and the second state, for example, presented according to a third state or a fourth state for distinguishing. The first state, the second state, the third state, and the fourth state are different from each other, for example, colors in the first state, the second state, the third state, and the fourth state are different from each other, and for example, sizes in the first state, the second state, the third state and the fourth state are different from each other.

As shown in FIG. 3B, in this embodiment of this application, interaction is implemented based on a search operation and a selecting operation, improving the flexibility of interaction and the degree of freedom of the user, improving the interaction efficiency in the electronic map, and improving the actual utilization rate of the computing resources consumed by the electronic device during interaction.

Figure 3C:
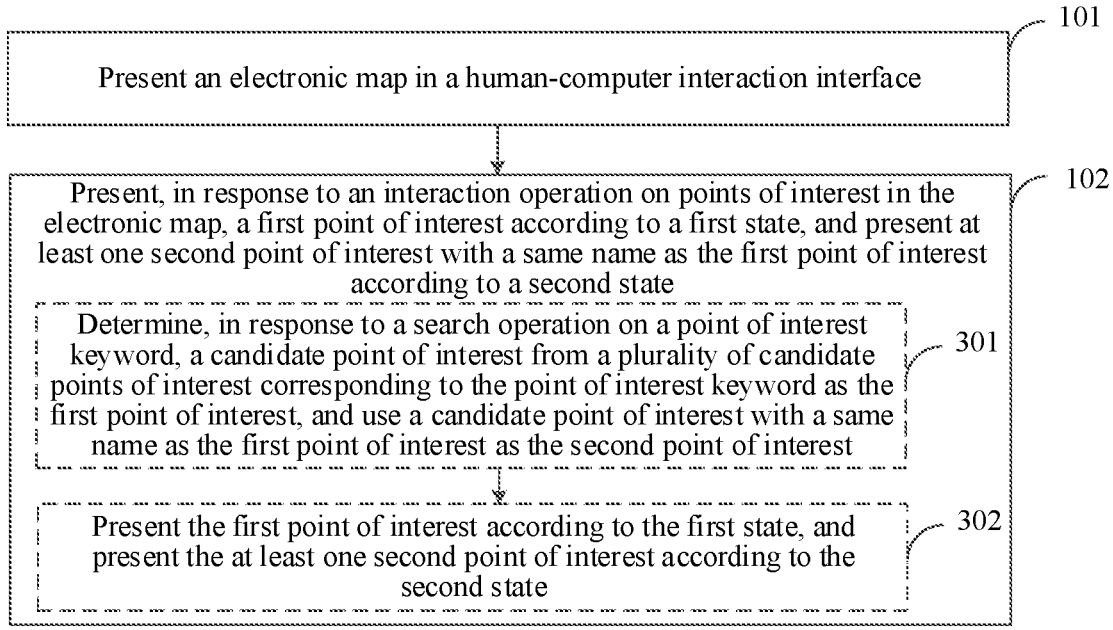
FIG. 3C is a schematic flowchart of an interaction method based on an electronic map according to an embodiment of this application.

In some embodiments, FIG. 3C is a schematic flowchart of an interaction method based on an electronic map according to an embodiment of this application. Step 102 shown in FIG. 3A may be implemented through steps 301 and 302, and a description is made with reference to each step.

Step 301. Determine, in response to a search operation on a point of interest keyword, a candidate point of interest from a plurality of candidate points of interest corresponding to the point of interest keyword, use the determined candidate point of interest as the first point of interest, and use a candidate point of interest with a same name as the first point of interest as the second point of interest.

In this embodiment of this application, the interaction operation may alternatively include only a search operation. When a search operation on a point of interest keyword is received, a plurality of points of interest corresponding to the point of interest keyword are first determined as candidate points of interest. The method for determining the candidate points of interest is similar to step 201. Then, a candidate point of interest is automatically determined from the plurality of candidate points of interest as the first point of interest, and a candidate point of interest with a same name as the first point of interest is used as the second point of interest. The second point of interest is different from the first point of interest.

In step 301, a presentation situation of the electronic map may not be changed, to be specific, there is no need to present the plurality of candidate points of interest according to the second state (the reason is that the user does not need to perform a selecting operation on the candidate points of interest), which can save the computing resources.

In some embodiments, the determining a candidate point of interest from a plurality of candidate points of interest corresponding to the point of interest keyword as the first point of interest may be implemented in the following manner: performing any one of the following processing on the plurality of candidate points of interest corresponding to the point of interest keyword to obtain the first point of interest: using any candidate point of interest among the plurality of candidate points of interest as the first point of interest; respectively determining straight-line distances between a real-time location and the plurality of candidate points of interest, and using a candidate point of interest with a shortest straight-line distance as the first point of interest; respectively determining traffic distances between the real-time location and the plurality of candidate points of interest according to a selected vehicle, and using a candidate point of interest with a shortest traffic distance as the first point of interest; and respectively determining degrees of arrival convenience between the real-time location and the plurality of candidate points of interest, and using a candidate point of interest with a highest degree of arrival convenience as the first point of interest, the degree of arrival convenience being determined according to at least one of a quantity of roads that need to be crossed and a degree of congestion.

The embodiments of this application provide the following four ways to automatically determine the first point of interest.

(1) Any candidate point of interest among the plurality of candidate points of interest is used as the first point of interest, that is, the first point of interest is obtained through random selection processing. In addition, the first point of interest may alternatively be preset.

(2) A straight-line distance between each candidate point of interest and a real-time location (a real-time location of an electronic device in the real world or a real-time location in the virtual scene) is determined. Then, a candidate point of interest with a shortest straight-line distance is used as the first point of interest.

(3) A traffic distance between each candidate point of interest and the real-time location is determined according to a currently selected vehicle, a distance from a candidate point of interest to the real-time location being the traffic distance based on the currently selected vehicle, and the vehicle being, for example, feat, a bicycle, or a car. Then, a candidate point of interest with a shortest traffic distance is used as the first point of interest.

(4) A degree of arrival convenience between the real-time location and each candidate point of interest is determined, the degree of arrival convenience being determined according to at least one of a quantity of roads that need to be crossed and a degree of congestion. The degree of arrival convenience is negatively correlated with the quantity of roads (for example, sidewalks) that need to be crossed, that is, a larger quantity of roads that need to be crossed indicates a lower degree of arrival convenience. The degree of arrival convenience is also negatively correlated with the degree of congestion, that is, a higher degree of congestion indicates a lower degree arrival convenience. After the degree of arrival convenience corresponding to each candidate point of interest is obtained, a candidate point of interest with a highest degree of arrival convenience is used as the first point of interest.

Through the foregoing four ways, the first point of interest is automatically determined through different factors, which can improve the applicability to different application scenarios.

Step 302. Present the first point of interest according to the first state, and present the at least one second point of interest according to the second state.

The determined first point of interest is presented in the first state. All the determined second points of interest are presented in the second state, thereby highlighting a difference between the first point of interest and the second point of interest.

The candidate points of interest that are different from the first point of interest and the second point of interest may not be presented, or may be presented according to a presentation state different from the first state and the second state, for example, according to a third state or a fourth state for distinguishing.

As shown in FIG. 3C, this embodiment of this application provides another way of interaction, that is, a first point of interest and a second point of interest are determined only according to a search operation, thereby effectively reducing operations that the user needs to perform, and improving the interaction efficiency in the electronic map, and improving the actual utilization rate of the computing resources consumed by the electronic device during interaction.

Figure 3D:
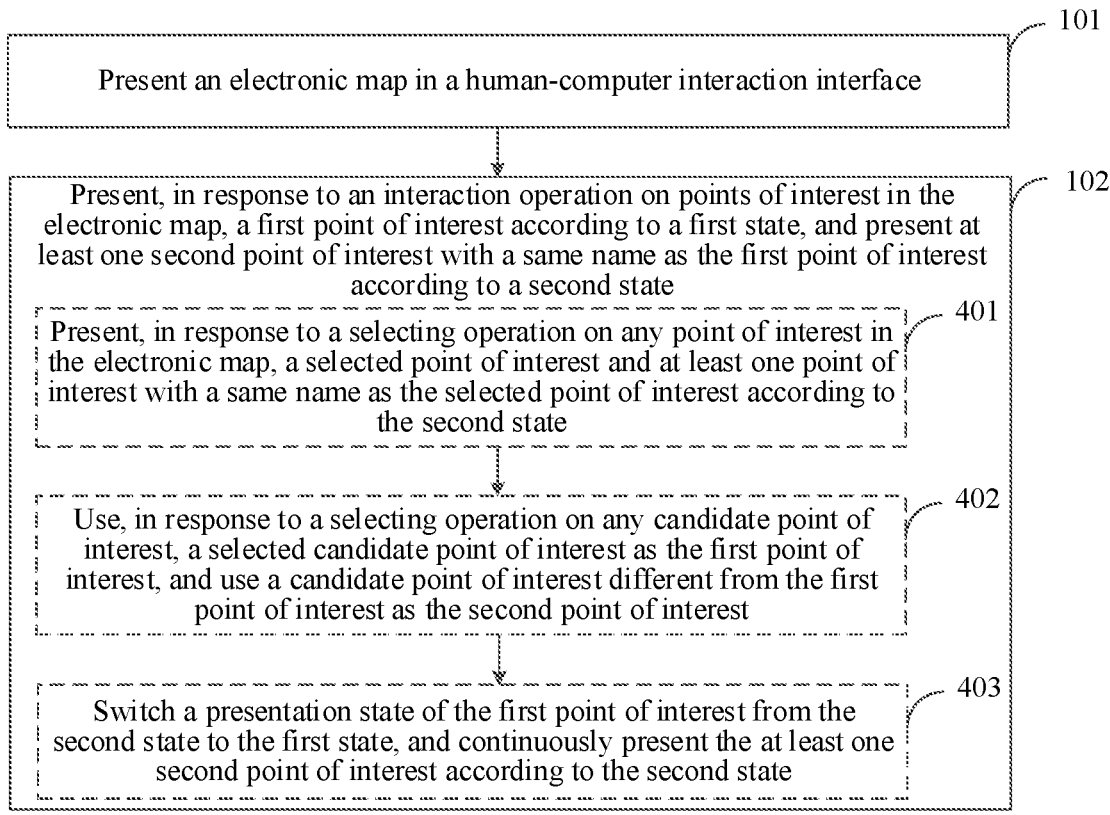
FIG. 3D is a schematic flowchart of an interaction method based on an electronic map according to an embodiment of this application.

In some embodiments, FIG. 3D is a schematic flowchart of an interaction method based on an electronic map according to an embodiment of this application. Step 102 shown in FIG. 3A may be implemented through steps 401 to 403, and a description is made with reference to each step.

Step 401. Present, in response to a selecting operation on any point of interest in the electronic map, a selected point of interest and at least one point of interest with a same name as the selected point of interest according to the second state.

In this embodiment of this application, the interaction operation may include two selecting operations. When a selecting operation on any point of interest in the electronic map is received, a selected point of interest and at least one point of interest with a same name as the selected point of interest are presented according to the same presentation state, so that the user can select a first point of interest. For ease of description, the points of interest presented herein are all named candidate points of interest, and a case where the same presentation state is the second state is used as an example. Similarly, summary information respectively corresponding to a plurality of candidate points of interest may also be presented herein.

Step 402. Use, in response to a selecting operation on any candidate point of interest, a selected candidate point of interest as the first point of interest, and use a candidate point of interest different from the first point of interest as the second point of interest.

The candidate point of interest includes the selected point of interest and the at least one point of interest with the same name as the selected point of interest. For the second selecting operation, that is, the received selecting operation on any candidate point of interest, the selected candidate point of interest is used as the first point of interest. All candidate points of interest different from the first point of interest are used as the second points of interest.

In some embodiments, the selecting operation on any candidate point of interest includes any one of the following: a selecting operation on an icon corresponding to any candidate point of interest; or a selecting operation on the summary information corresponding to any candidate point of interest.

Step 403. Switch the presentation state of the first point of interest from the second state to the first state, and continuously present the at least one second point of interest according to the second state.

The presentation state of the first point of interest is switched from the second state to the first state, and the presentation states of all the second points of interest are kept unchanged.

The points of interest that are different from the first point of interest and the second point of interest may not be presented, or may be presented according to a presentation state different from the first state and the second state, for example, according to a third state or a fourth state for distinguishing.

As shown in FIG. 3D, this embodiment of this application provides another way of interaction. The accuracy of the determined first point of interest can be improved through two selecting operations, which is suitable for application scenarios that mainly support or only support the selecting operation, and improving the interactive efficiency of the electronic map, and improving the actual utilization rate of the computing resources consumed by the electronic device during the interactive process.

Figure 3E:
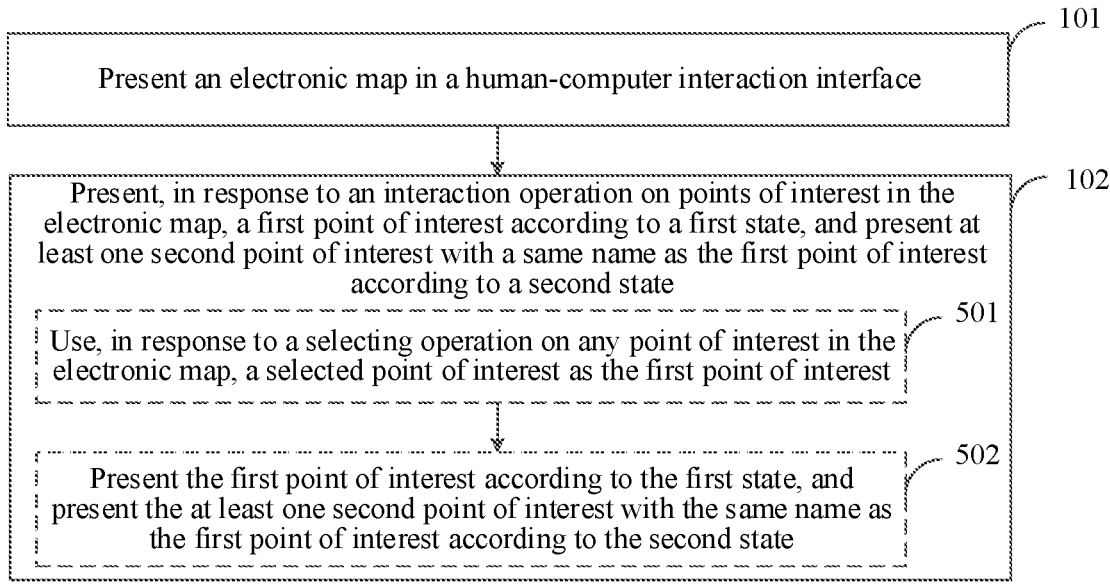
FIG. 3E is a schematic flowchart of an interaction method based on an electronic map according to an embodiment of this application.

In some embodiments, FIG. 3E is a schematic flowchart of an interaction method based on an electronic map according to an embodiment of this application. Step 102 shown in FIG. 3A may be implemented through steps 501 and 502, and a description is made with reference to each step.

Step 501. Use, in response to a selecting operation on any point of interest in the electronic map, a selected point of interest as the first point of interest.

In this embodiment of this application, the interaction operation may alternatively include only one selecting operation. When a selecting operation (for example, a selecting operation on an icon corresponding to any point of interest) on any point of interest in the electronic map is received, a selected point of interest is used as the first point of interest.

Step 502. Present the first point of interest according to the first state, and present the at least one second point of interest with the same name as the first point of interest according to the second state.

The at least one second point of interest with the same name as the first point of interest is determined, the first point of interest is presented in the first state, and the second point of interest is presented in the second state.

The points of interest that are different from the first point of interest and the second point of interest may not be presented, or may be presented according to a presentation state different from the first state and the second state, for example, according to a third state or a fourth state for distinguishing.

As shown in FIG. 3E, this embodiment of this application provides another way of interaction, which can minimize the operations that the user needs to perform, simplifying the interaction process, improving the interaction efficiency in the electronic map, and improving the actual utilization of the computing resources consumed by the electronic device during interaction.

Figure 3F:
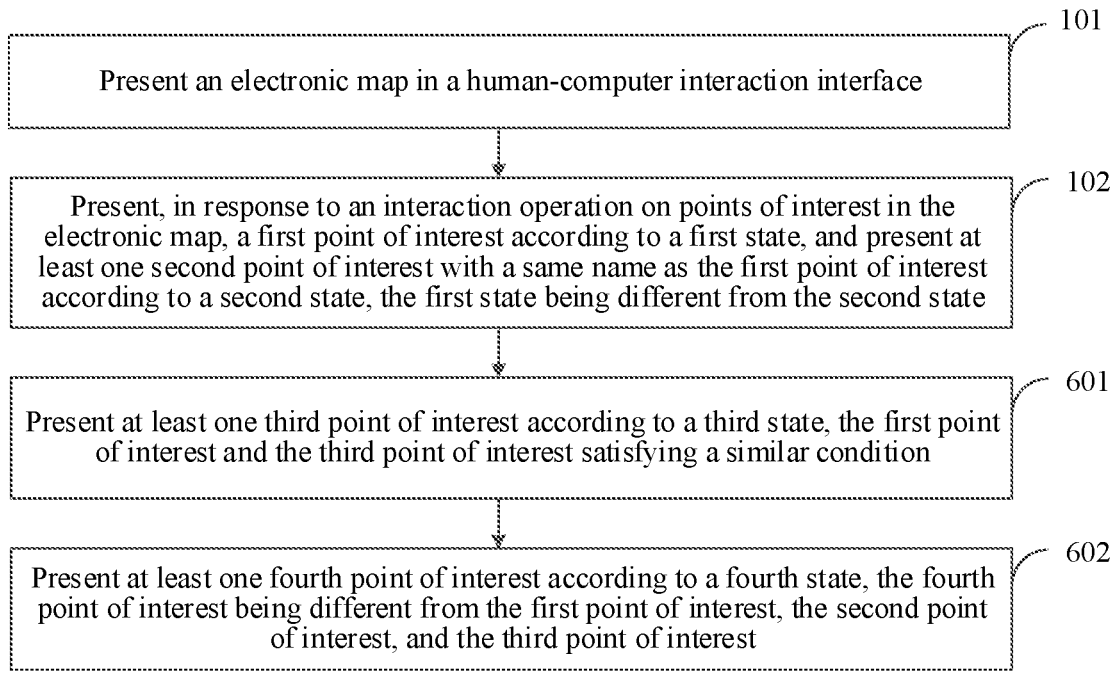
FIG. 3F is a schematic flowchart of an interaction method based on an electronic map according to an embodiment of this application.

In some embodiments, FIG. 3F is a schematic flowchart of an interaction method based on an electronic map according to an embodiment of this application. Based on FIG. 3A, when the first point of interest is presented according to the first state, and the at least one second point of interest with the same name as the first point of interest is presented according to the second state, in step 601, at least one third point of interest may further be presented according to a third state, the first point of interest and the third point of interest satisfying a similar condition.

In this embodiment of this application, in addition to presenting the first point of interest and all the second points of interest, other points of interest may also be presented. For example, among a plurality of points of interest that are different from the first point of interest and all the second points of interest, a point of interest that satisfies a similar condition with the first point of interest is determined as a third point of interest.

In some embodiments, for any point of interest different from the first point of interest and the second point of interest, the following processing is performed: determining a similarity between any point of interest and the first point of interest based on at least one of a name, a type, or a purpose; and using the any point of interest as the third point of interest when the similarity is greater than a similarity threshold.

For each point of interest (which named as a point of interest A for ease of description) that is different from the first point of interest and all the second points of interest, a similarity between a feature of the point of interest A and a feature of the first point of interest may be used as a similarity between the point of interest A and the first point of interest. The feature of the point of interest may be at least one of a name, a type, or a purpose. Similarly, a similarity between two features may be calculated by using an edit distance algorithm or through a machine learning model.

When the similarity between the point of interest A and the first point of interest is greater than a set similarity threshold, the point of interest A is used as the third point of interest, and the similarity threshold may be set according to an actual application scenario. Through the foregoing method, the screened third point of interest that satisfies the similar condition with the first point of interest can meet a potential search requirement of the user.

Step 602. Present at least one fourth point of interest according to a fourth state, the fourth point of interest being different from the first point of interest, the second point of interest, and the third point of interest. The first state, the second state, the third state, and the fourth state are different from each other.

A point of interest that is different from the first point of interest, the second point of interest, and the third point of interest is used as a fourth point of interest. If there is at least one fourth point of interest, the fourth point of interest is presented in the electronic map according to a fourth state. The first state, the second state, the third state, and the fourth state are different from each other. In some embodiments, because importance degrees of the first point of interest, the second point of interest, the third point of interest, and the fourth point of interest decrease, identification degrees of the first state, the second state, the third state, and the fourth state may also decrease accordingly.

In some embodiments, the first state, the second state, the third state, and the fourth state being different from each other includes: presenting different colors and/or sizes for icons corresponding to points of interest in different presentation states, content of the icon including at least one of a name or unique identification information of the point of interest.

Different presentation states may correspond to different presentation parameters. The presentation parameter refers to the color and/or the side of the icon, and certainly may further include another parameter. The content of the icon may include at least one of a graphic representing a type of a point of interest, a name of the point of interest, or unique identification information of the point of interest. Content of the icons corresponding to different presentation states may be the same, for example, includes only unique identification information; or may be different, for example, the icon corresponding to the first state and the icon corresponding to the second state both include graphics, names, and unique identification information, the icon corresponding to the third state includes only a graphic and a name, and the icon corresponding to the fourth state includes only a graphic. Through the foregoing method, the difference of visual effects in different presentation states can be ensured, and the first point of interest, the second point of interest, the third point of interest, and the fourth point of interest can be effectively distinguished.

In some embodiments, for a plurality of points of interest with a same name, the following processing is performed: obtaining a plurality of pieces of unique identification information with order; using a point of interest that satisfies a location limit condition among the plurality of points of interest as an initial point of interest, and assigning the first unique identification information to the initial point of interest according to the order; and traversing the remaining points of interest in the plurality of points of interest according to a set direction by using the initial point of interest as a starting point, and assigning the remaining unique identification information to the traversed points of interest according to the order.

In this embodiment of this application, when names of the plurality of points of interest are the same, unique identification information is used for distinguishing the plurality of points of interest, and the unique identification information may be distinction information such as a serial number added before a name of a point of interest in an electronic map, unique identification information corresponding to each point of interest may also correspond to the real world, and the unique identification information may be a platform A or a platform B in the real world; or may be unique identification information automatically assigned for the plurality of points of interest with the same name, and an automatic assigning method is described herein by using an example.

For example, a plurality of pieces of unique identification information with order may be obtained, for example, a platform A, a platform B, . . . , and a platform Z. A point of interest that satisfies a location limit condition among a plurality of points of interest with a same name is used as an initial point of interest, and the first unique identification information (for example, the platform A) in the plurality of piece of unique identification information is assigned to the initial point of interest. For example, when an electronic map is oriented from the north or the south, a leftmost (that is, westernmost) point of interest is used as the initial point of interest.

Then, remaining points of interest in the plurality of points of interest are traversed according to a set direction by using the initial point of interest as a starting point. For example, the set direction may be a clockwise direction with a north direction as a starting axis. According to the order of the unique identification information, the unique identification information may be arranged in any order, and the remaining unique identification information is assigned to the traversed points of interest. For example, the second unique identification information (for example, the platform B) is assigned to the first traversed point of interest; and; the third unique identification information (for example, the platform C) is assigned to the second traversed point of interest, and so on. Through the foregoing method, the unique identification information can be automatically assigned. Because the assigning rule does not change with factors such as time and user selection, the validity and stability of the unique identification information can be ensured.

In some embodiments, the presenting at least one fourth point of interest according to a fourth state may be implemented in the following manner: obtaining an interaction quantity corresponding to each fourth point of interest; and presenting a fourth point of interest whose interaction quantity is greater than a quantity threshold according to the fourth state, the interaction quantity representing a quantity of historical interaction operations corresponding to the fourth point of interest For each determined fourth point of interest, an interaction quantity corresponding to the fourth point of interest may be obtained, and the interaction quantity may be a quantity of historical interaction operations for the fourth point of interest. The historical interaction operation may refer to only a historical search operation, or may refer to only a historical selecting operation, or may include both a historical search operation and a historical selecting operation. Because the historical interaction operation can reflect a historical requirement of the user, the fourth point of interest whose interaction quantity is greater than the quantity threshold may be presented according to the fourth state, and a fourth point of interest with interaction quantity is less than or equal to the quantity threshold is not presented, so that the computing resources can be effectively saved.

As shown in FIG. 3F, in this embodiment of this application, the first point of interest, the second point of interest, the third point of interest, and the fourth point of interest are presented in different presentation states, which can effectively reflect the difference between different points of interest and is convenient for the user to find.

Figure 3G:
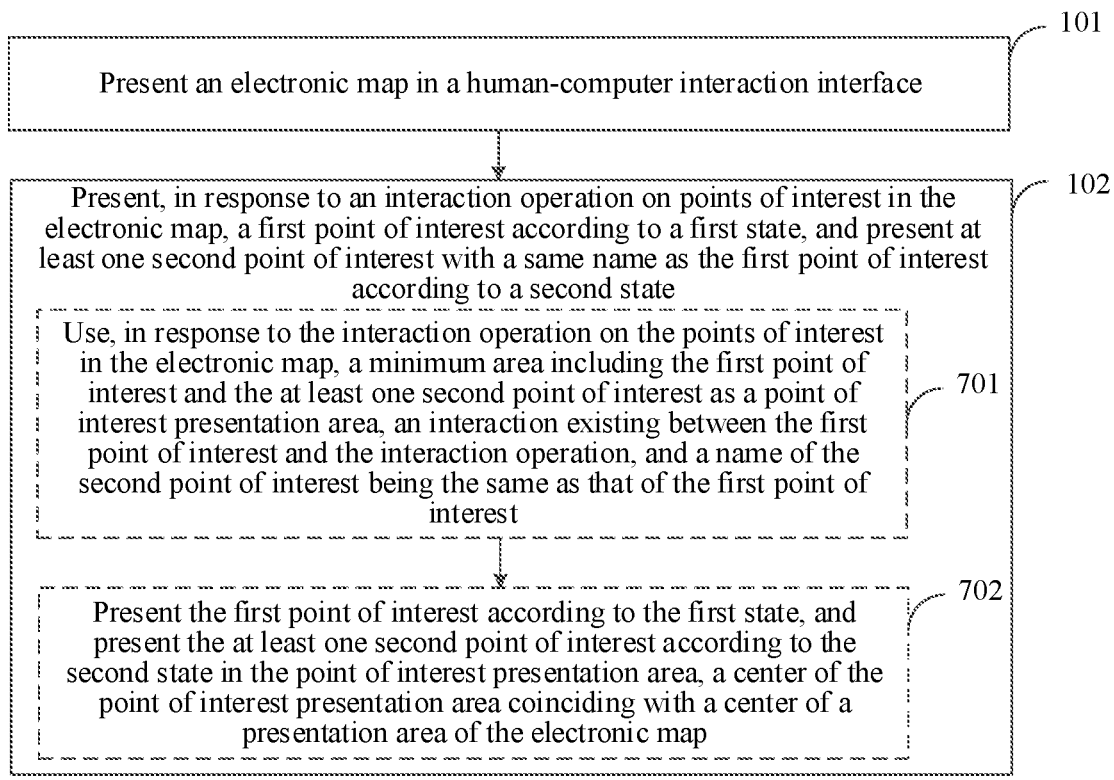
FIG. 3G is a schematic flowchart of an interaction method based on an electronic map according to an embodiment of this application.

In some embodiments, FIG. 3G is a schematic flowchart of an interaction method based on an electronic map according to an embodiment of this application. Step 102 shown in FIG. 3A may be implemented through steps 701 and 702, and a description is made with reference to each step.

Step 701. Use a minimum area including the first point of interest and the at least one second point of interest as a point of interest presentation area in response to an interaction operation on the points of interest in the electronic map, the first point of interest interacting with the interaction operation, and a name of the second point of interest being the same as that of the first point of interest.

A minimum area including the first point of interest and all the second points of interest may be used as a point of interest presentation area. An outline of the point of interest presentation area may be displayed as a rectangle or a circle.

In some embodiments, after step 701, any one of the following processing may further performed: filling a presentation area of the electronic map according to the point of interest presentation area; and expanding the point of interest presentation area to obtain a new point of interest presentation area, and filling the presentation area of the electronic map according to the new point of interest presentation area.

After the point of interest presentation area is obtained, a presentation area used for presenting the electronic map in the human-computer interaction interface may be directly filled according to the point of interest presentation area, and the process may involve scaling of the point of interest presentation area. After the filling is completed, the presentation area of the electronic map coincides with the point of interest presentation area.

In the foregoing method, a point of interest is displayed in a center of an area, which is more in line with a habit of reading pictures of the user, so as to facilitate the user to quickly find the point of interest. A point of interest presentation area may be expanded according to a set expansion parameter, to obtain a new point of interest presentation area, and then a presentation area of the electronic map is filled according to the new point of interest presentation area. The expansion parameter is a straight-line distance (also referred to as a margin value) that expands (extends) outwards in four directions: up, down, left, and right, and the filling process may also involve proportion scaling of the new point of interest presentation area. After the filling is completed, the presentation area of the electronic map coincides with the new point of interest presentation area.

The center of the (new) point of interest presentation area may be targeted to coincide with the center of the presentation area of the electronic map for filling.

Step 702. Present the first point of interest according to the first state, and present the at least one second point of interest according to the second state in the point of interest presentation area, a center of the point of interest presentation area coinciding with a center of the presentation area of the electronic map.

In the point of interest presentation area, the first point of interest is presented according to the first state, and the at least one second point of interest is presented according to the second state. Certainly, the at least one third point of interest may further be presented according to the third state, and the at least one fourth point of interest may be presented according to the fourth state. The center of the point of interest presentation area coincides with the center of the presentation area of the electronic map, so that the presentation effect can be improved. If the presentation area of the electronic map includes another presentation area that is different from the point of interest presentation area, the another presentation area may be presented according to a default presentation state, or the points of interest may not be presented or any content of the electronic map may not be presented to save computing resources.

As shown in FIG. 3G, in this embodiment of this application, by determining a point of interest presentation area, a presentation effect of the points of interest can be improved, and unnecessary points of interest can be avoided, to save the computing resource.

Figure 4A:
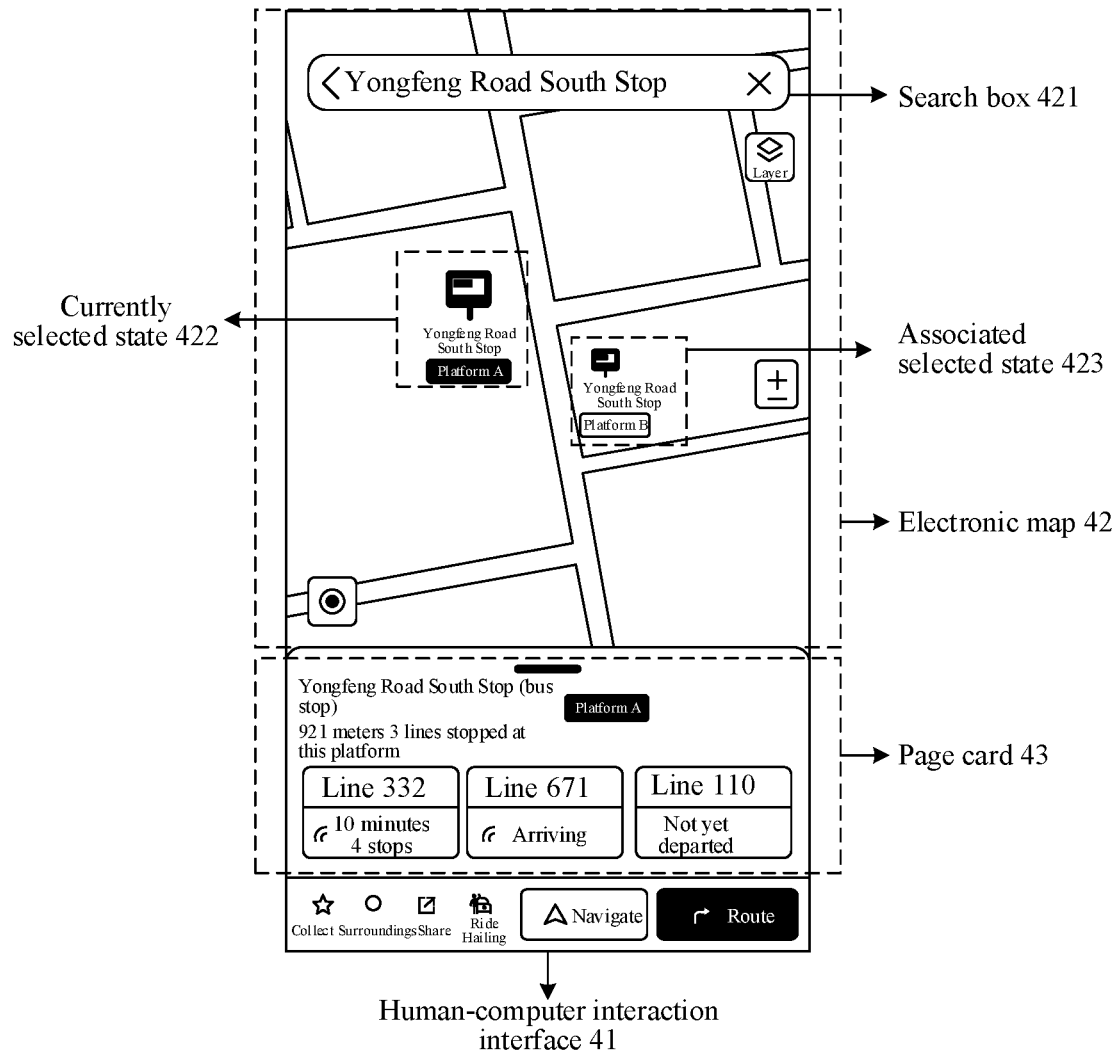
FIG. 4A is a schematic diagram of a human-computer interaction interface according to an embodiment of this application.

The following describes an exemplary application of the embodiments of this application in an actual application scenario. For ease of understanding, a description is made by using an example in which the point of interest is a bus stop. In this embodiment of this application, when a search operation on a bus stop and/or a selecting operation on a bus stop is received, a corresponding presentation may be performed according to a quantity of bus stops with a same name. As an example, a schematic diagram of a human-computer interaction interface shown in FIG. 4A is provided. An electronic map 42 and a page card 43 are shown in the human-computer interaction interface 41, and a search box 421 is also displayed in a presentation area of the electronic map 42 in a superimposition manner. When a search operation on a search keyword "Yongfeng Road South Stop" is received (for example, a user inputs "Yongfeng Road South Stop" in the search box 421), two candidate bus stops (which correspond to the candidate points of interest) corresponding to "Yongfeng Road South Stop" are determined from a plurality of bus stops included in the electronic map 42, that is, a Yongfeng Road South Stop platform A and a Yongfeng Road South Stop platform B, and the search keyword corresponds to the foregoing point of interest keyword. There two candidate bus stops, then one of the candidate bus stops may be selected by default to be displayed in a currently selected state (which corresponds to the first state), and the other remaining candidate bus stop is displayed in an associated selected state (which corresponds to the second state). In FIG. 4A, a description is made by using an example in which the Yongfeng Road South Stop platform A (which corresponds to the first point of interest) is presented according to the currently selected state 422, and the Yongfeng Road South Stop platform B (which corresponds to the second point of interest) is presented according to the associated selected state 423. In the currently selected state 422 and the associated selected state 423, presented icons include a graphic, a name (that is, Yongfeng Road South Stop), and unique identification information (the platform A or the platform B), a difference is that a size corresponding to the currently selected state 422 is larger than a size corresponding to the associated selected state 423, and the unique identification information is presented according to different colors, which can facilitate the user to distinguish. The presentation states (the icons corresponding to the presentation states) may be superimposed on a base map of the electronic map 42, to display the presentation states, and the base image is located at the bottom of a plurality of layers included in the electronic map 42.

In the page card 43 shown in FIG. 4A, only summary information corresponding to the bus stop presented according to the currently selected state may be presented. As shown in FIG. 4A, the summary information of the Yongfeng Road South Stop platform A includes a name, unique Identification information, a distance to a real-time location (for example, straight-line distance), and summary information of a bus line in operation (for example, a name of the bus line and an arrival status). Alternatively, the summary information corresponding to the bus stop presented according to the currently selected state and the summary information corresponding to the bus stop presented according to the associated selected state may be presented simultaneously, for example, presented in the form of a list. When a viewing operation on any summary information is received, corresponding detailed information may be presented. The viewing operation on any summary information may be a trigger operation on a presentation area of any summary information. Certainly, the viewing operation may be defined according to an actual application scenario.

Figure 4B:
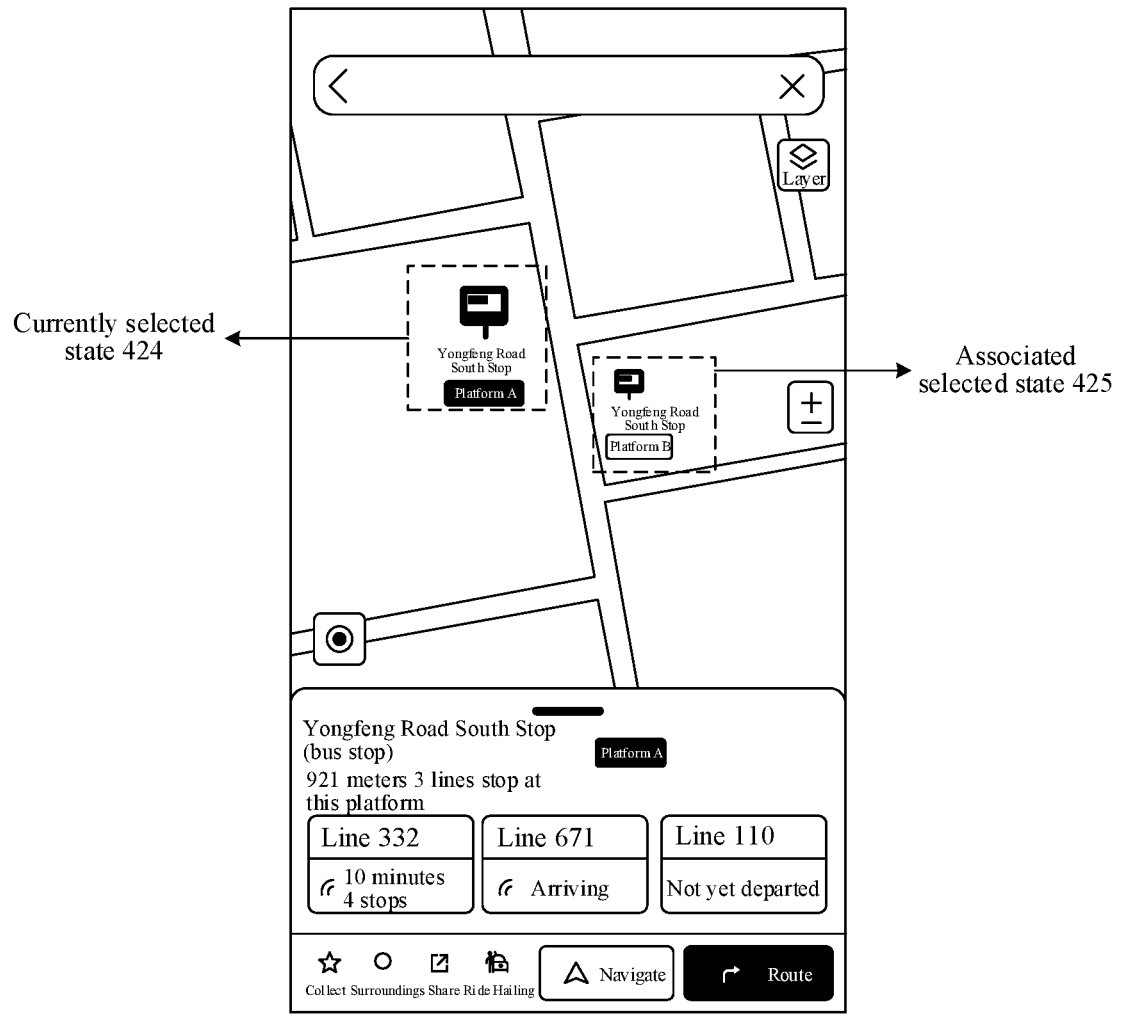
FIG. 4B is a schematic diagram of a human-computer interaction interface according to an embodiment of this application.

In addition to the search operation, the selecting operation may also be supported in this embodiment of this application. As shown in FIG. 4B, when a selecting operation (for example, a click/tap operation) on the Yongfeng Road South Stop platform A (referring to an icon corresponding to the Yongfeng Road South Stop platform A presented in the electronic map) is received, the Yongfeng Road South Stop platform A is presented according to the currently selected state 424, and the Yongfeng Road South Stop platform B is presented according to the associated selected state 425. In a scenario corresponding to FIG. 4B, no search operation is received, that is, the search box is empty.

Figure 5A:
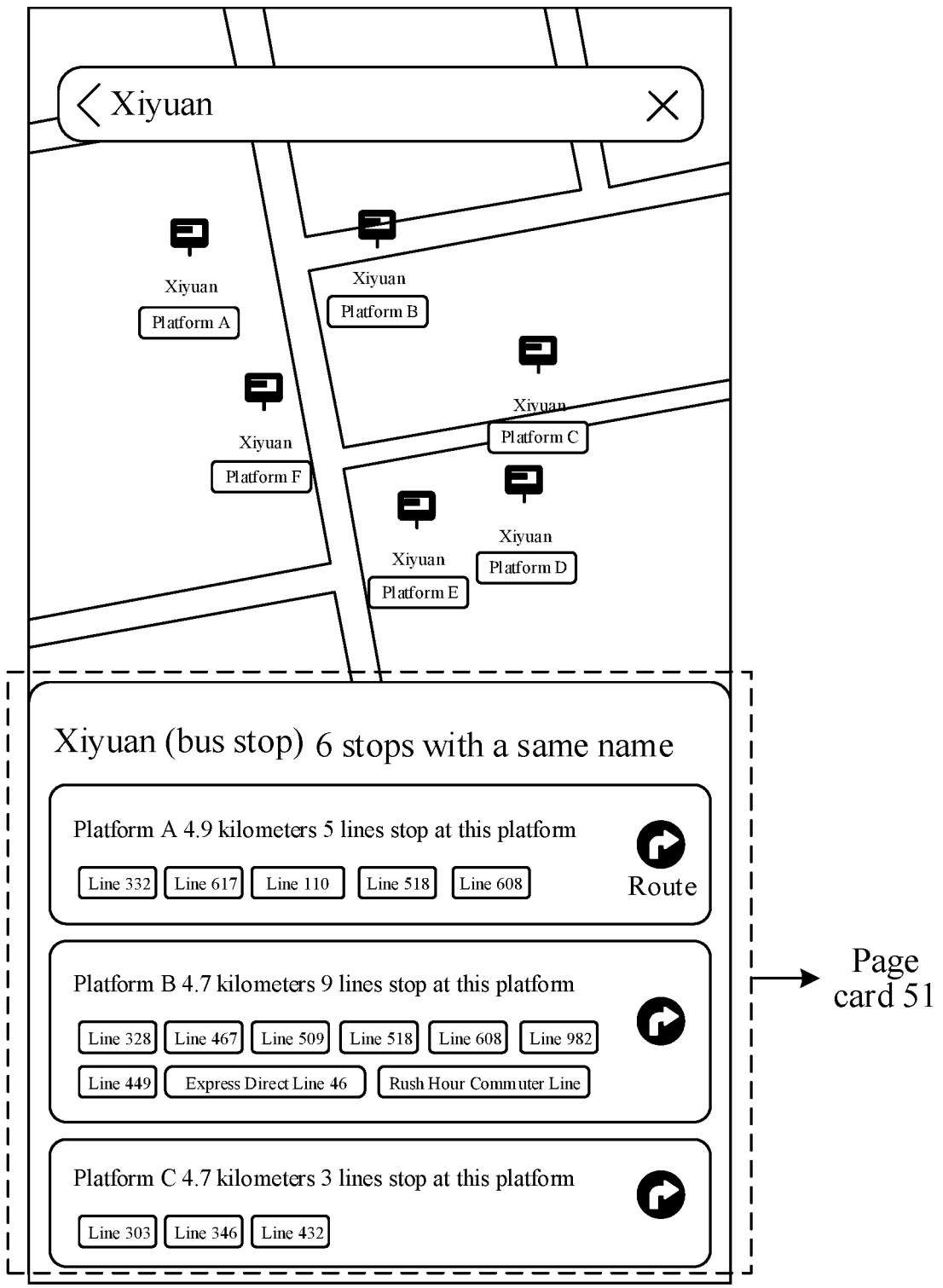
FIG. 5A is a schematic diagram of a human-computer interaction interface according to an embodiment of this application.

In another case, when there are more than two candidate bus stops, all candidate bus stops obtained through the search operation may be presented in the associated selected state first. As an example, a schematic diagram of a human-computer interaction interface shown in FIG. 5A is provided. The electronic map shows a Xiyuan platform A, a Xiyuan platform B, . . . , and a Xiyuan platform F that are presented according to the associated selected state. In addition, summary information corresponding to each candidate bus stop is also presented in a page card 51 in the form of a list. Due to the limitation of a presentation area of the page card 51, summary information respectively corresponding to the Xiyuan platform A, the Xiyuan platform B, and the Xiyuan C platform shown in FIG. 5A is used as an example, and other summary information (for example, summary information corresponding to the Xiyuan D stop) can be displayed through a received sliding operation.

Figure 5B:
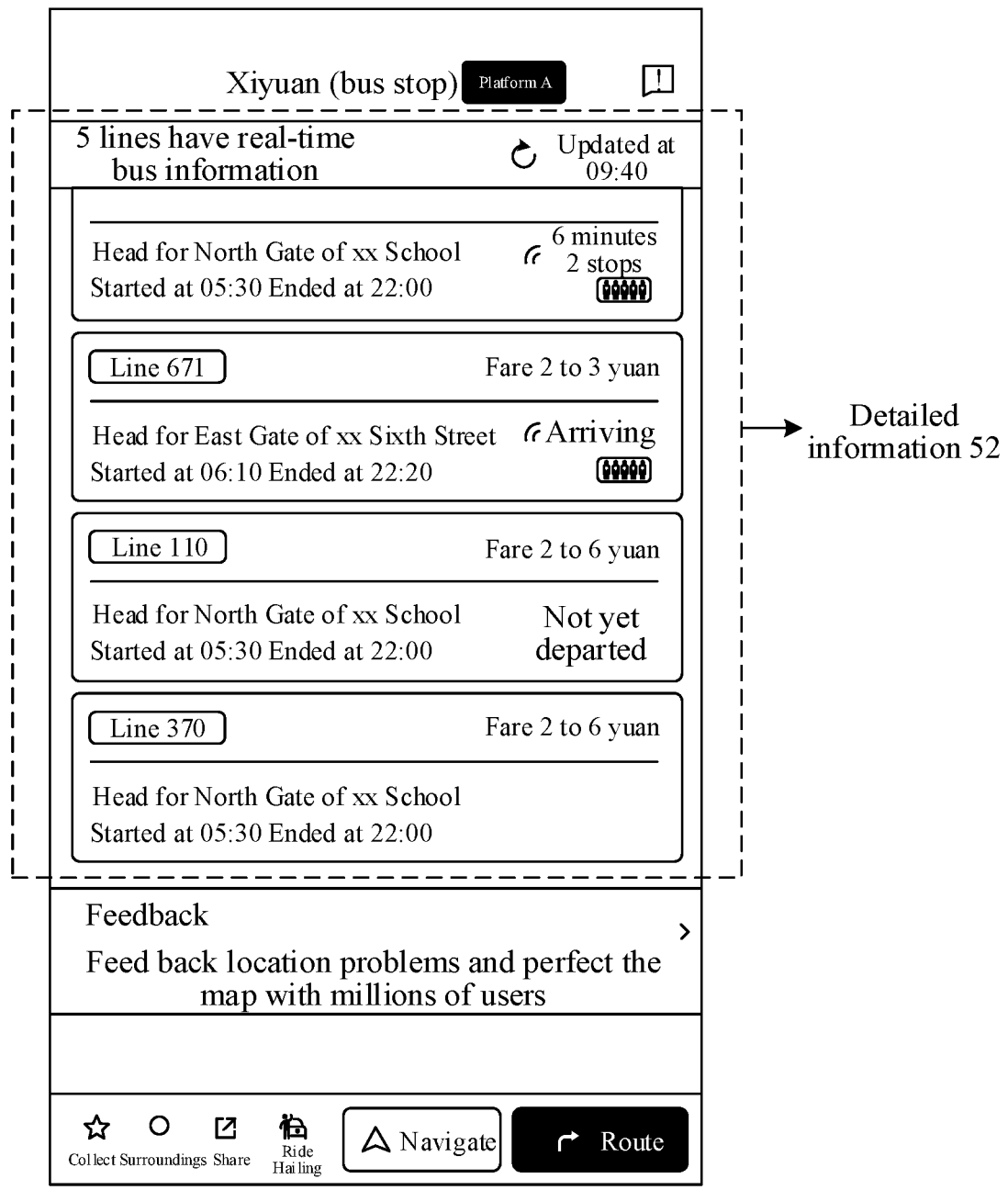
FIG. 5B is a schematic diagram of a human-computer interaction interface according to an embodiment of this application.

Based on FIG. 5A, when a viewing operation on any summary information is received, corresponding detailed information may be presented. The viewing operation on any summary information may be a trigger operation on a "route" option in a presentation area for any summary information, and certainly, this does not constitute a limitation on the embodiments of this application. In FIG. 5B, detailed information 52 corresponding to the Xiyuan platform A is used as an example for illustration. The detailed information 52 includes a quantity of bus lines (that is, "5 lines have real-time bus information") and update time (that is, "updated at 09:40"), and also includes a destination of each bus line (for example, a north gate of xx school), a fare, time of the first bus, time of the last bus, arrival time of the closest vehicle, a quantity of platforms separated from the closest vehicle, and a degree of congestion of the closest vehicle. Limited by a size of a presentation area of the detailed information, only a part of the detailed information may be presented, for example, detailed information corresponding to some bus lines, and the remaining detailed information may be presented through the received sliding operation. When the detailed information is slidably presented through the received sliding operation, the quantity of bus lines and the update time may be fixed.

Figure 5C:
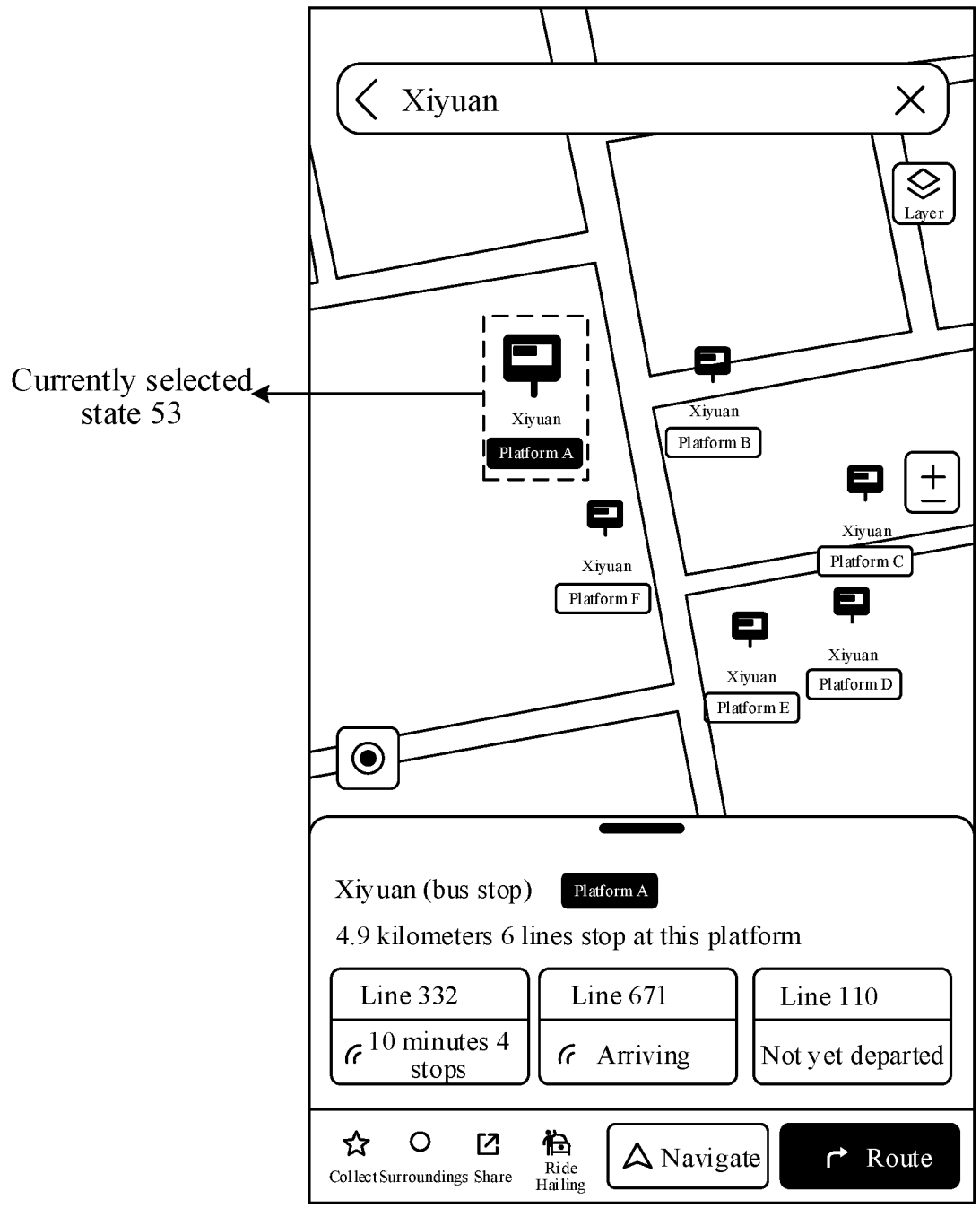
FIG. 5C is a schematic diagram of a human-computer interaction interface according to an embodiment of this application.

Based on FIG. 5A, when a selecting operation on any candidate bus stop is received, a selected candidate bus stop is presented according to the currently selected state, and other bus stations (that is, the remaining candidate bus stops) with a same name as the selected candidate bus stop are continuously presented according to the associated selected state. In FIG. 5C, an example in which the selected candidate bus stop is the Xiyuan platform A is used, and the Xiyuan platform A presented according to a currently selected state 53 and the Xiyuan platform F presented according to an associated selected state 54 are exemplarily shown. The received selecting operation on the Xiyuan platform A may be a selecting operation on an icon (which refers to the icon presented in the electronic map in FIG. 5A) corresponding to the Xiyuan platform A, or may be a selecting operation on summary information corresponding to the Xiyuan platform A, for example, a trigger operation on a presentation area other than the "route" option in the presentation area of the summary information corresponding to the Xiyuan platform A. Certainly, the selecting operation may be defined according to an actual application scenario and not limited to the example herein.

Figure 5D:
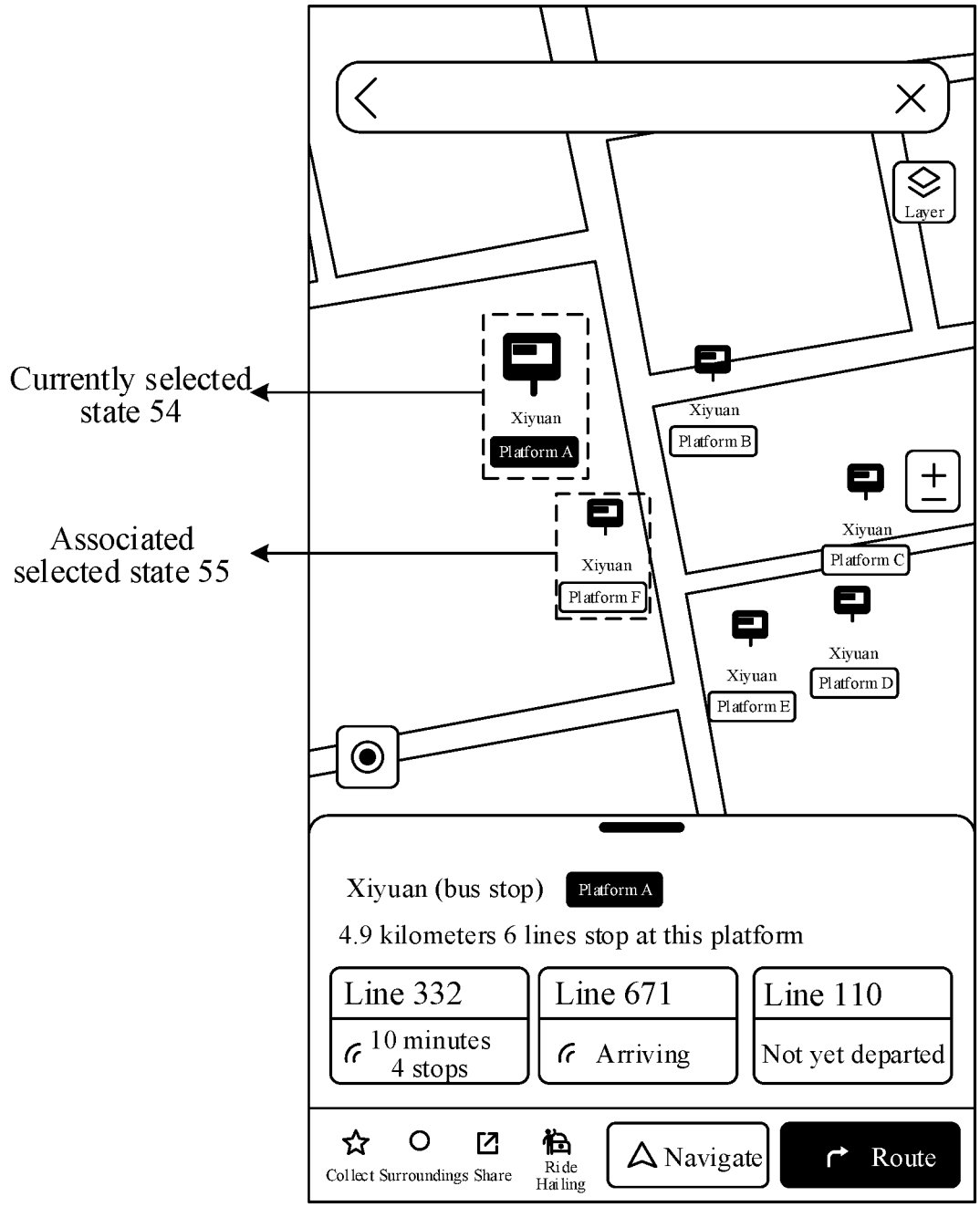
FIG. 5D is a schematic diagram of a human-computer interaction interface according to an embodiment of this application.

In addition to the search operation shown in FIG. 5A, the selecting operation may further be supported in this embodiment of this application. As shown in FIG. 5D, when a selecting operation (for example, a click/tap operation) on the Xiyuan platform A (referring to the icon corresponding to the Xiyuan platform A presented in the electronic map) is received, the Xiyuan platform A is presented according to the currently selected state 54 platform, and the Xiyuan platform F presented according to the associated selected state 55 is further exemplarily shown. In a scenario corresponding to FIG. 5D, no search operation is received, that is, the search box is empty.

Figure 6:
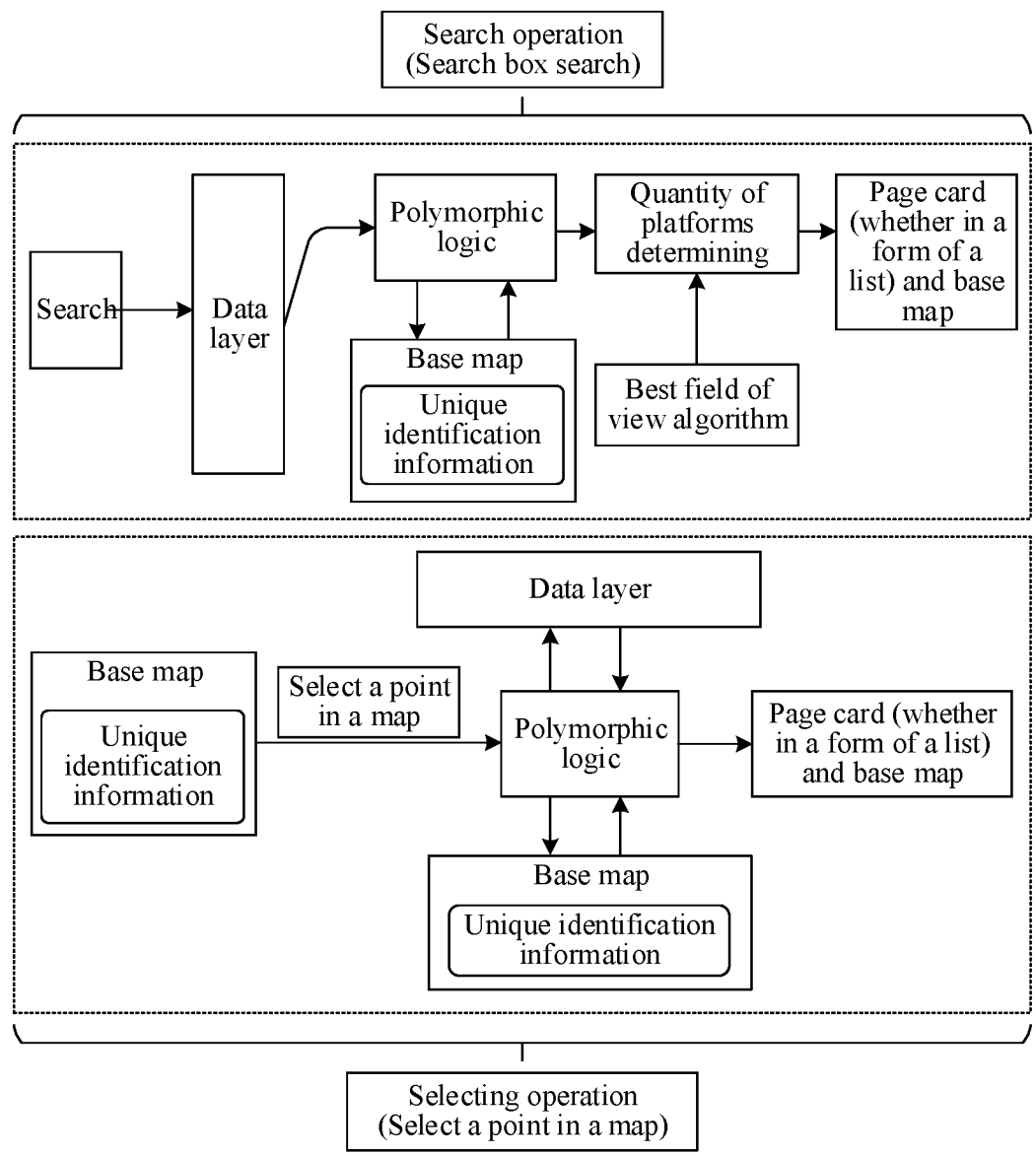
FIG. 6 is a schematic diagram of an architecture of an interaction system based on an electronic map according to an embodiment of this application.

In this embodiment of this application, unique identification information is assigned to a bus stop, a presentation state that needs to be presented is determined according to a received operation, and a result that meets a requirement of the user is displayed in the electronic map in combination with a capability of the client, so that the user can identify a plurality of platforms accurately and quickly. As an example, FIG. 6 is a schematic diagram of an architecture of an interaction system based on an electronic map according to an embodiment of this application. For ease of understanding, described description is made in the form of serial number.

(1) Unique Identification Information.

For a plurality of bus stops with a same name in a real world, it is necessary to assign unique identification information to each bus stop for distinguishing. The unique identification information assigned to the bus stop does not change due to time or user selection. For example, the assigning method may include:

1. Use capital letters A to Z in sequence as a plurality of pieces of unique identification information to be assigned.

2. Determine a leftmost (which corresponds to the foregoing location limit condition) bus stop in a plurality of bus stops with a same name as an initial stop (which corresponds to the foregoing initial point of interest) with the orientation of from north to south of an electronic map, and assign the first unique identification information, that is, the letter A, to the initial stop.

3. Traverse the remaining bus stops in a clockwise direction by using the initial stop as a starting point and a north direction as a starting axis, and sequentially assign the remaining unique identification information.

Figure 7A:
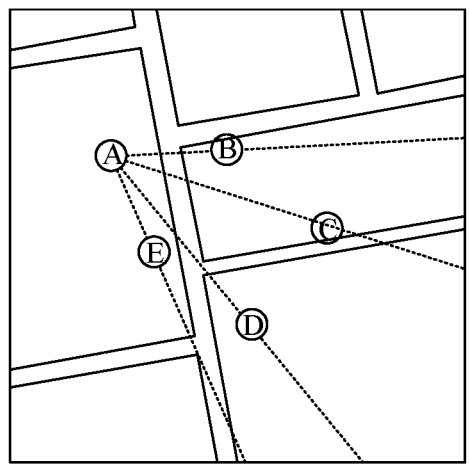
FIG. 7A is a schematic diagram of assigning unique identification information according to an embodiment of this application.
Figure 7B:
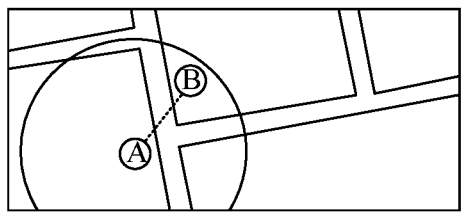
FIG. 7B is a schematic diagram of assigning unique identification information according to an embodiment of this application.
Figure 7C:
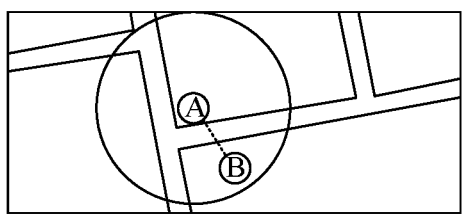
FIG. 7C is a schematic diagram of assigning unique identification information according to an embodiment of this application.

As an example, FIG. 7A is a schematic diagram of assigning unique identification information when there are five bus stops with a same name. FIG. 7B and FIG. 7C are schematic diagrams of assigning unique identification information when there are two bus stops with a same name.

(2) Polymorphic Marking (Polymorphic Logic).

Figure 8:
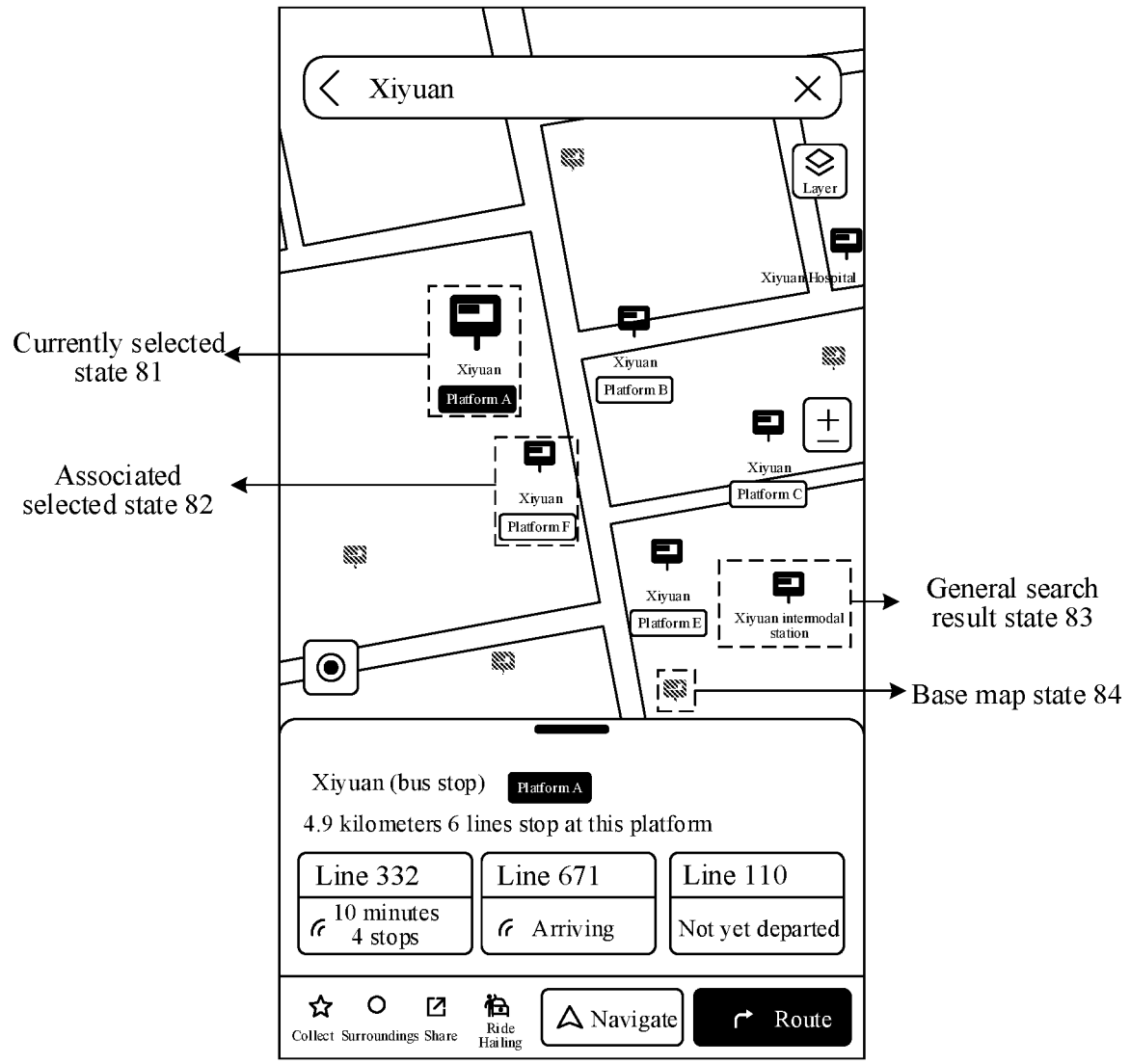
FIG. 8 is a schematic diagram of a plurality of presentation states according to an embodiment of this application.

In addition to assigning the unique identification information, in this embodiment of this application, the bus stops in the electronic map are marked with presentation states and presented according to an interaction operation (for example, a search operation and/or a selecting operation). The presentation state includes, but not limited to, a currently selected state, an associated selected state, a general search result state (which corresponds to the foregoing third state), and a base map state (which corresponds to the foregoing fourth state). The currently selected state is used for marking a selected (or selected by default) bus stop. The associated selected state is used for marking other bus stops with a same name as the selected bus stop. The general search result state is used for marking bus stops that satisfy a similar condition (for example, a similar condition based on a name) with the selected bus stop. The base map state is used for marking remaining bus stops. As an example, FIG. 8 is a schematic diagram of a plurality of presentation states. A currently selected state 81, an associated selected state 82, a general search result state 83, and a base image state 84 are exemplarily shown.

3) Best Field of View Algorithm.

After presentation states of bus stops in an electronic map is marked, a presentation area (which corresponds to the foregoing point of interest presentation area) of the bus stops is determined according to the best field of view algorithm, which is implemented in the following ways:

First, a rectangular area is constructed according to a longitude and a latitude of a bus stop marked with the currently selected state and a longitude and a latitude of a bus stop marked with the associated selected state. For example, the rectangular area may be a minimum area that can accommodate all bus stops marked with the currently selected state and all bus stops marked with the associated selected state. The rectangular area is the presentation area of the bus stops.

Next, a center of the rectangular area is placed at a center of the presentation area of the electronic map. The presentation area of the electronic map may be the presentation area of the electronic map 42 shown in FIG. 4A, or may be an area between a lower edge of the search box and an upper edge of the page card. Then, the rectangular area is expanded according to a set expansion parameter (for example, margin values set in four directions of up, down, left, and right) to fill the presentation area of the electronic map according to a new rectangular area (an expanded rectangular area).

Then, in the new rectangular area, the bus stops marked with various presentation states are presented.

4) System Framework.

Figure 9:
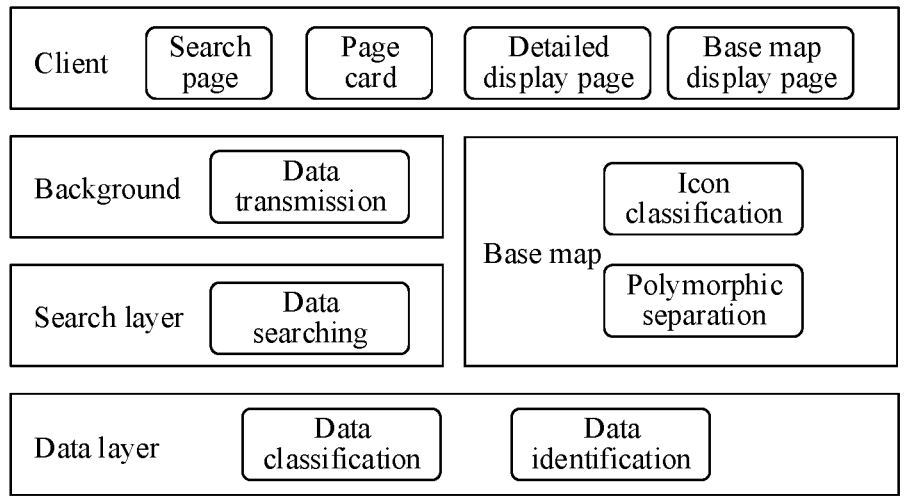
FIG. 9 is a schematic diagram of an architecture of an interaction system based on an electronic map according to an embodiment of this application.

This embodiment of this application may be implemented based on mutual communication among a plurality of modules such as a client, a background (server), a search layer, a data layer, and a base map, and the background, the search layer, and the data layer belong to a background category but are divided into different functional modules due to different functions. Similarly, a base map belongs to a client category. As an example, FIG. 9 is a schematic diagram of an architecture according to an embodiment of this application. In FIG. 9, the data layer is configured to provide data classification (that is, provide different presentation states) and data identification (that is, provide unique identification information) capabilities of a stop, the search layer is configured to provide a data search capability for a bus stop, the background is configured to provide a data transmission capability (for example, transmitting a point of interest keyword and a presentation state), the base map is configured to provide an icon classification capability (for example, provide different icons for different presentation states), and a loading capability of the presentation state, and the client is configured to provide a user-oriented search capability (for example, the capability is implemented based on a search box or a search page), a summary information presentation capability (for example, the capability is implemented based on a page card), a detailed information presentation capability (for example, the capability is implemented based on a specific detailed display page), and an electronic map presentation capability (for example, the capability is implemented based on a base map presentation page, that is, a presentation area of an electronic map).

5) Timing Diagram.

Figure 10:
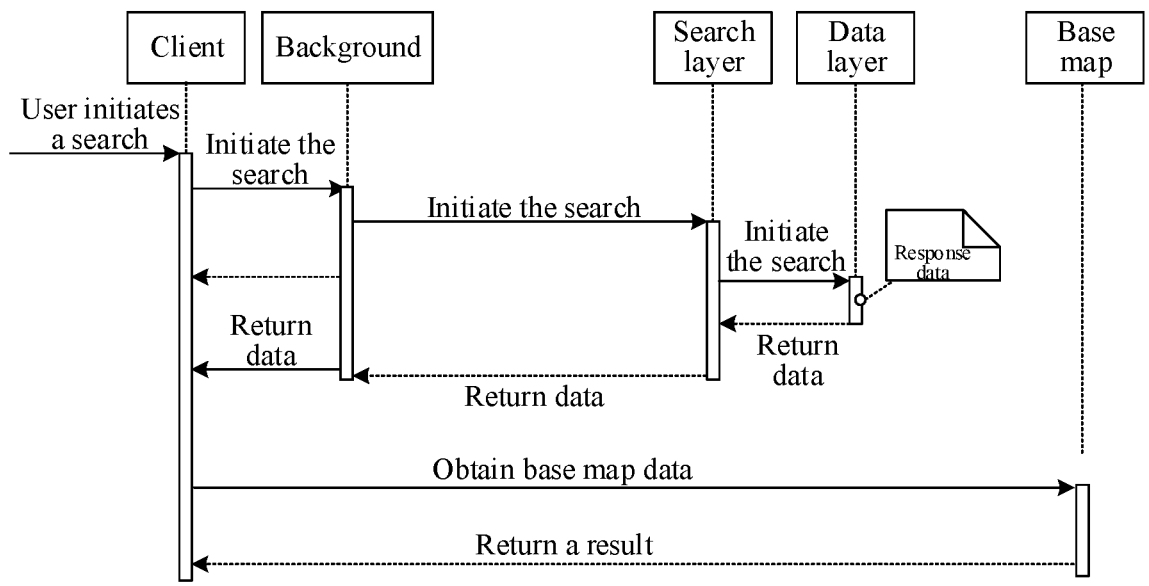
FIG. 10 is a schematic timing diagram of an interaction method based on an electronic map according to an embodiment of this application.

As an example, FIG. 10 is a timing diagram according to an embodiment of this application. When receiving a search (a search operation) initiated by a user, a client initiates the search to a background, and the background converts data and initiates the search to a search layer. The search layer further initiates the search to a data layer, and after receiving response data returned by the data layer, and the search layer sends the response data to the background. The background converts the response data to data (for example, a presentation state of each bus stop and detailed information and summary information of each bus stop) available to the client and returns the data to the client, so that the client can present bus stops marked with various presentation states in a presentation area of the bus stops, and the client can obtain base map data from a base map, for example, relevant data (for example, relevant data of a road, a river, a bus stop) of the electronic map or icons corresponding to the presentation states for presentation. The search layer provides the search capability for all services, and some of which are not required by the client or do not meet a format requirement of the client, for example, points of interest other than bus stops. Therefore, the background can filter and organize the data provided by the search layer to obtain data and a data format required by the client, and can also filter and organize the data (for example, relevant data of the search operation) provided by the client.

In this embodiment of this application, bus stops with a same name are differentiated and corresponding presentation states marked for different bus stops according to an interaction operation, so that problems that the user is inconvenient to search and gets to a wrong bus stop caused by an excessively large quantity of bus stops with a same name can be resolved.

The following continues to describe an exemplary structure in which an interaction apparatus 455 based on an electronic map according to an embodiment of this application is implemented as a software module. In some embodiments. As shown in FIG. 2, the software module of the interaction apparatus 455 based on an electronic map stored in the memory 450 may include: a map presentation module 4551, configured to present an electronic map in a human-computer interaction interface; and a state presentation module 4552, configured to present a first point of interest according to a first state in response to an interaction operation on points of interest in the electronic map, and present at least one second point of interest with a same name as the first point of interest according to a second state, the first state being different from the second state.

In some embodiments, the interaction operation includes a search operation and a selecting operation; and the state presentation module 4552 is further configured to: present, in response to the search operation on a point of interest keyword, a plurality of candidate points of interest corresponding to the point of interest keyword according to the second state; use, in response to the selecting operation on any candidate point of interest, a selected candidate point of interest as the first point of interest, and use a candidate point of interest with a same name as the first point of interest as the second point of interest; and switch a presentation state of the first point of interest from the second state to the first state, and continuously present the at least one second point of interest according to the second state.

In some embodiments, the state presentation module 4552 is further configured to: present summary information respectively corresponding to a plurality of candidate points of interest; and present, in response to a viewing operation on summary information corresponding to any candidate point of interest, detailed information corresponding to any candidate point of interest.

In some embodiments, the selecting operation on any candidate point of interest includes any one of the following: a selecting operation on an icon corresponding to any candidate point of interest; or a selecting operation on the summary information corresponding to any candidate point of interest.

In some embodiments, the interaction operation includes a search operation; and the state presentation module 4552 is further configured to: determine, in response to the search operation on a point of interest keyword, one candidate point of interest from among a plurality of candidate points of interest corresponding to the point of interest keyword as the first point of interest, and use a candidate point of interest with a same name as the first point of interest as the second point of interest; and present the first point of interest according to the first state, and present the at least one second point of interest according to the second state.

In some embodiments, the state presentation module 4552 is further configured to: perform any one of the following processing on the plurality of candidate points of interest corresponding to the point of interest keywords to obtain the first point of interest: using any candidate point of interest among the plurality of candidate points of interest as the first point of interest; respectively determining straight-line distances between a real-time location and the plurality of candidate points of interest, and using a candidate point of interest with a shortest straight-line distance as the first point of interest; respectively determining traffic distances between the real-time location and the plurality of candidate points of interest according to a selected vehicle, and using a candidate point of interest with a shortest traffic distance as the first point of interest; and respectively determining degrees of arrival convenience between the real-time location and the plurality of candidate points of interest, and using a candidate point of interest with a highest degree of arrival convenience as the first point of interest, the degree of arrival convenience being determined according to at least one of a quantity of roads that need to be crossed or a degree of congestion.

In some embodiments, the interaction operation includes two selecting operations; and the state presentation module 4552 is further configured to: present, in response to the selecting operation on any point of interest in the electronic map, a selected point of interest and at least one point of interest with a same name as the selected point of interest according to the second state, the candidate points of interest including the selected point of interest and the at least one point of interest with the same name as the selected point of interest; use, in response to the selecting operation on any candidate point of interest, a selected candidate point of interest as the first point of interest, and use a candidate point of interest different from the first point of interest as the second point of interest; and switch a presentation state of the first point of interest from the second state to the first state, and continuously present the at least one second point of interest according to the second state.

In some embodiments, the interaction operation includes a selecting operation; and the state presentation module 4552 is further configured to: use, in response to the selecting operation on any point of interest in the electronic map, a selected point of interest as the first point of interest; and present the first point of interest according to the first state, and present the at least one second point of interest with the same name as the first point of interest according to the second state.

In some embodiments, the state presentation module 4552 is further configured to: present at least one third point of interest according to a third state, a first point of interest and the third point of interest satisfying a similar condition; and present at least one fourth point of interest according to a fourth state, the fourth point of interest being different from the first point of interest, the second point of interest, and the third point of interest, and the first state, the second state, the third state, and the fourth state being different from each other.

In some embodiments, the first state, the second state, the third state, and the fourth state being different from each other includes: presenting different colors and/or sizes for icons corresponding to points of interest in different presentation states, content of the icon including at least one of a name or unique identification information of the point of interest.

In some embodiments, the state presentation module 4552 is further configured to perform the following processing for the plurality of points of interest with the same name: obtaining a plurality of pieces of unique identification information with order; using a point of interest that satisfies a location limit condition among the plurality of points of interest as an initial point of interest, and assigning the first unique identification information to the initial point of interest according to the order; and traversing the remaining points of interest in the plurality of points of interest according to a set direction by using the initial point of interest as a starting point, and assigning the remaining unique identification information to the traversed points of interest according to the order.

In some embodiments, the state presentation module 4552 is further configured to perform the following processing for any point of interest different from the first point of interest and the second point of interest: determining a similarity between any point of interest and the first point of interest based on at least one of a name, a type, or a purpose; and using the any point of interest as the third point of interest when the similarity is greater than a similarity threshold.

In some embodiments, the state presentation module 4552 is further configured to: obtain an interaction quantity corresponding to each fourth point of interest; and present a fourth point of interest whose interaction quantity is greater than a quantity threshold according to the fourth state, the interaction quantity representing a quantity of historical interaction operations corresponding to the fourth point of interest.

In some embodiments, the state presentation module 4552 is further configured to: use a minimum area including the first point of interest and the at least one second point of interest as a point of interest presentation area; and present the first point of interest according to the first state, and present the at least one second point of interest according to the second state in the point of interest presentation area, a center of the point of interest presentation area coinciding with a center of a presentation area of the electronic map.

In some embodiments, the state presentation module 4552 is further configured to: perform any one of the following processing: filling a presentation area of the electronic map according to the point of interest presentation area; and expanding the point of interest presentation area to obtain a new point of interest presentation area, and filling the presentation area of the electronic map according to the new point of interest presentation area.

In some embodiments, the state presentation module 4552 is further configured to perform any one of the following processing: presenting summary information corresponding to each point of interest in the first point of interest and the at least one second point of interest; and presenting summary information corresponding to the first point of interest, the summary information corresponding to the point of interest being obtained by performing summary extraction processing on the detailed information corresponding to the point of interest.

In some embodiments, the state presentation module 4552 is further configured to: replace, in response to a selecting operation on any second point of interest, the first point of interest according to a selected second point of interest; and switch a presentation state of the replaced first point of interest from the second state to the first state, and switch the presentation state of the first point of interest before replacement from the first state to the second state.

The embodiments of this application further provide a computer program product or a computer program. The computer program product or the computer program includes computer instructions, the computer instructions being stored in a computer-readable storage medium. A processor of a computer device reads the computer instructions from the computer-readable storage medium, and executes the computer instructions, to cause the computer device to perform the foregoing interaction method based on an electronic map according to the embodiments of this application.

The embodiments of this application provide a computer-readable storage medium storing executable instructions. When the executable instructions are executed by a processor, the processor is caused to perform the method in the embodiments of this application, for example, an interaction method based on an electronic map as shown in FIG. 3A, FIG. 3B, FIG. 3C, FIG. 3D, FIG. 3E, FIG. 3F, and FIG. 3G.

In some embodiments, a computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

In summary, in this embodiment of this application, when an interaction operation on points of interest in an electronic map is received, a first point of interest is presented according to a first state, and at least one second point of interest with a same name as the first point of interest is presented according to a second state. In this way, on one hand, a plurality of points of interest, that is, the first point of interest and the second point of interest, that may meet a requirement of a user can be highlighted. On the other hand, the first point of interest and the second point of interest that have the same name can also be effectively differentiated, so that the user can quickly find a point of interest that meets the requirement. That is, in the embodiments of this application, the interaction efficiency in the electronic map can be improved, and the actual utilization rate of the computing resources consumed by the electronic device during interaction can also be improved.

The foregoing descriptions are merely embodiments of this application and are not intended to limit the protection scope of this application. Any modification, equivalent replacement, or improvement made without departing from the spirit and range of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An interaction method based on an electronic map performed by an electronic device, and the method comprising:
   presenting an electronic map in a human-computer interaction interface;
   receiving a search operation on the electronic map, the search operation including a keyword corresponding to name of a point of interest;
   in response to the search operation, determining a plurality of candidate points of interest matching the keyword, the plurality of candidate points of interest including a first point of interest and a second point of interest;
   presenting, on the electronic map, the first point of interest according to a first state and the second point of interest with a same name as the first point of interest according to a second state, the first state being different from the second state;
   presenting, concurrently with the electronic map, summary information corresponding to the first point of interest;
   receiving a sliding operation on the summary information;
   in response to the sliding operation, displaying summary information corresponding to the second point of interest;
   receiving a viewing operation on the summary information corresponding to the second point of interest;
   in response to the viewing operation, displaying detailed information corresponding to the second point of interest including one or more transportation routes where the second point of interest is located.

2. The method according to claim 1, wherein
   the presenting, on the electronic map, the first point of interest according to a first state and the second point of interest with a same name as the first point of interest according to a second state comprises:
   in response to the search operation on a point of interest keyword, presenting, on the electronic map, a plurality of candidate points of interest corresponding to the point of interest keyword according to the second state;
   using a selected candidate point of interest as the first point of interest in response to a selecting operation on any candidate point of interest, and using a candidate point of interest with a same name as the first point of interest as the at least one second point of interest; and
   switching a presentation state of the first point of interest from the second state to the first state while continuously presenting the at least one second point of interest according to the second state.

3. The method according to claim 2, wherein the presenting a plurality of candidate points of interest corresponding to the point of interest keyword according to the second state further comprises:
   presenting summary information respectively corresponding to the plurality of candidate points of interest.

4. The method according to claim 1, wherein
   the presenting, on the electronic map, the first point of interest according to a first state and the second point of interest with a same name as the first point of interest according to a second state comprises:
   in response to the search operation on a point of interest keyword, determining a candidate point of interest from a plurality of candidate points of interest corresponding to the point of interest keyword, using the determined candidate point of interest as the first point of interest, and using a candidate point of interest with a same name as the first point of interest as the at least second point of interest; and
   presenting, on the electronic map, the first point of interest according to the first state and the at least one second point of interest according to the second state.

5. The method according to claim 1, wherein the viewing operation comprises two selecting operations; and
   the presenting, on the electronic map, the first point of interest according to a first state and the second point of interest with a same name as the first point of interest according to a second state comprises:
   in response to the selecting operation on any point of interest in the electronic map, presenting, on the electronic map, a selected point of interest and at least one point of interest with a same name as the at least one selected point of interest according to the second state, candidate points of interest comprising the selected point of interest and the at least one point of interest with the same name as the selected point of interest;
   in response to the selecting operation on any candidate point of interest, using a selected candidate point of interest as the first point of interest and a candidate point of interest different from the first point of interest as the second point of interest; and
   switching a presentation state of the first point of interest from the second state to the first state while continuously presenting the at least one second point of interest according to the second state.

6. The method according to claim 1, wherein the viewing operation comprises a selecting operation; and
   the presenting, on the electronic map, the first point of interest according to a first state and the second point of interest with a same name as the first point of interest according to a second state comprises:
   in response to the selecting operation on any point of interest in the electronic map, using a selected point of interest as the first point of interest; and
   presenting, on the electronic map, the first point of interest according to the first state and the at least one second point of interest with the same name as the first point of interest according to the second state.

7. The method according to claim 1, wherein the presenting, on the electronic map, the first point of interest according to a first state and the second point of interest with a same name as the first point of interest according to a second state further comprises:

presenting, on the electronic map, at least one third point of interest according to a third state, the first point of interest and the third point of interest satisfying a similar condition; and presenting, on the electronic map, at least one fourth point of interest according to a fourth state, the fourth point of interest being different from the first point of interest, the second point of interest, and the third point of interest, and the first state, the second state, the third state, and the fourth state being different from each other.

8. The method according to claim 1, wherein the presenting, on the electronic map, the first point of interest according to a first state and the second point of interest with a same name as the first point of interest according to a second state comprises:

using a minimum area comprising the first point of interest and the at least one second point of interest as a point of interest presentation area; and presenting, on the electronic map, the first point of interest according to the first state and the at least one second point of interest according to the second state in the point of interest presentation area, a center of the point of interest presentation area coinciding with a center of a presentation area of the electronic map.

9. The method according to claim 1, wherein the method further comprises:

replacing, in response to a selecting operation on any second point of interest, the first point of interest according to a selected second point of interest; and switching a presentation state of the replaced first point of interest from the second state to the first state, and switching the presentation state of the first point of interest before replacement from the first state to the second state.

10. An electronic device, comprising:

a memory, configured to store executable instructions; and a processor, configured to, when executing the executable instructions stored in the memory, perform an interaction method based on an electronic map including:

presenting an electronic map in a human-computer interaction interface;

receiving a search operation on the electronic map, the search operation including a keyword corresponding to name of a point of interest;

in response to the search operation, determining a plurality of candidate points of interest matching the keyword, the plurality of candidate points of interest including a first point of interest and a second point of interest;

presenting, on the electronic map, the first point of interest according to a first state and the second point of interest with a same name as the first point of interest according to a second state, the first state being different from the second state;

presenting, concurrently with the electronic map, summary information corresponding to the first point of interest;

receiving a sliding operation on the summary information;

in response to the sliding operation, displaying summary information corresponding to the second point of interest;

receiving a viewing operation on the summary information corresponding to the second point of interest;

in response to the viewing operation, displaying detailed information corresponding to the second point of interest including one or more transportation routes where the second point of interest is located.

11. The electronic device according to claim 10, wherein the presenting, on the electronic map, the first point of interest according to a first state and the second point of interest with a same name as the first point of interest according to a second state comprises:

in response to the search operation on a point of interest keyword, presenting, on the electronic map, a plurality of candidate points of interest corresponding to the point of interest keyword according to the second state;

using a selected candidate point of interest as the first point of interest in response to a selecting operation on any candidate point of interest, and using a candidate point of interest with a same name as the first point of interest as the at least one second point of interest; and switching a presentation state of the first point of interest from the second state to the first state while continuously presenting the at least one second point of interest according to the second state.

12. The electronic device according to claim 11, wherein the presenting, on the electronic map, the first point of interest according to a first state and the second point of interest with a same name as the first point of interest according to a second state further comprises:

presenting summary information respectively corresponding to the plurality of candidate points of interest.

13. The electronic device according to claim 10, wherein the presenting, on the electronic map, the first point of interest according to a first state and the second point of interest with a same name as the first point of interest according to a second state comprises:

in response to the search operation on a point of interest keyword, determining a candidate point of interest from a plurality of candidate points of interest corresponding to the point of interest keyword, using the determined candidate point of interest as the first point of interest, and using a candidate point of interest with a same name as the first point of interest as the at least second point of interest; and presenting, on the electronic map, the first point of interest according to the first state and the at least one second point of interest according to the second state.

14. The electronic device according to claim 10, wherein the viewing operation comprises two selecting operations; and the presenting, on the electronic map, the first point of interest according to a first state and the second point of interest with a same name as the first point of interest according to a second state comprises:

in response to the selecting operation on any point of interest in the electronic map, presenting, on the electronic map, a selected point of interest and at least one point of interest with a same name as the at least one selected point of interest according to the second state, candidate points of interest comprising the selected point of interest and the at least one point of interest with the same name as the selected point of interest;

in response to the selecting operation on any candidate point of interest, using a selected candidate point of interest as the first point of interest and a candidate point of interest different from the first point of interest as the second point of interest; and switching a presentation state of the first point of interest from the second state to the first state while continuously presenting the at least one second point of interest according to the second state.

15. The electronic device according to claim 10, wherein the viewing operation comprises a selecting operation; and
the presenting, on the electronic map, the first point of interest according to a first state and the second point of interest with a same name as the first point of interest according to a second state comprises:
in response to the selecting operation on any point of interest in the electronic map, using a selected point of interest as the first point of interest; and
presenting, on the electronic map, the first point of interest according to the first state and the at least one second point of interest with the same name as the first point of interest according to the second state.

16. The electronic device according to claim 10, wherein the presenting, on the electronic map, the first point of interest according to a first state and the second point of interest with a same name as the first point of interest according to a second state further comprises:
presenting, on the electronic map, at least one third point of interest according to a third state, the first point of interest and the third point of interest satisfying a similar condition; and
presenting, on the electronic map, at least one fourth point of interest according to a fourth state, the fourth point of interest being different from the first point of interest, the second point of interest, and the third point of interest, and
the first state, the second state, the third state, and the fourth state being different from each other.

17. The electronic device according to claim 10, wherein the presenting, on the electronic map, the first point of interest according to a first state and the second point of interest with a same name as the first point of interest according to a second state comprises:
using a minimum area comprising the first point of interest and the at least one second point of interest as a point of interest presentation area; and
presenting, on the electronic map, the first point of interest according to the first state and the at least one second point of interest according to the second state in the point of interest presentation area,
a center of the point of interest presentation area coinciding with a center of a presentation area of the electronic map.

18. The electronic device according to claim 10, wherein the method further comprises:
replacing, in response to a selecting operation on any second point of interest, the first point of interest according to a selected second point of interest; and
switching a presentation state of the replaced first point of interest from the second state to the first state, and switching the presentation state of the first point of interest before replacement from the first state to the second state.

19. A non-transitory computer-readable storage medium, storing executable instructions, the executable instructions, when executed by a processor of an electronic device, causing the electronic device to implementing an interaction method based on an electronic map including:
presenting an electronic map in a human-computer interaction interface;
receiving a search operation on the electronic map, the search operation including a keyword corresponding to name of a point of interest;
in response to the search operation, determining a plurality of candidate points of interest matching the keyword, the plurality of candidate points of interest including a first point of interest and a second point of interest;
presenting, on the electronic map, the first point of interest according to a first state and the second point of interest with a same name as the first point of interest according to a second state, the first state being different from the second state;
presenting, concurrently with the electronic map, summary information corresponding to the first point of interest;
receiving a sliding operation on the summary information;
in response to the sliding operation, displaying summary information corresponding to the second point of interest;
receiving a viewing operation on the summary information corresponding to the second point of interest;
in response to the viewing operation, displaying detailed information corresponding to the second point of interest including one or more transportation routes where the second point of interest is located.

20. The non-transitory computer-readable storage medium according to claim 19, wherein
the presenting, on the electronic map, the first point of interest according to a first state and the second point of interest with a same name as the first point of interest according to a second state comprises:
in response to the search operation on a point of interest keyword, presenting, on the electronic map, a plurality of candidate points of interest corresponding to the point of interest keyword according to the second state;
using a selected candidate point of interest as the first point of interest in response to a selecting operation on any candidate point of interest, and using a candidate point of interest with a same name as the first point of interest as the at least one second point of interest; and
switching a presentation state of the first point of interest from the second state to the first state while continuously presenting the at least one second point of interest according to the second state.

* * * * *